(12) United States Patent
Cahan et al.

(10) Patent No.: US 11,766,076 B2
(45) Date of Patent: Sep. 26, 2023

(54) SUPPORT GARMENT WITH CANTILEVERED SINUSOIDAL SUPPORT FORM

(71) Applicant: Anthony Crawford Cahan, Pound Ridge, NY (US)

(72) Inventors: Anthony Crawford Cahan, Pound Ridge, NY (US); Kevin R. Skeuse, Stockton, NJ (US); Paul Dowd, Scarsdale, NY (US); Bennet O. Poepping, Tuckahoe, NY (US)

(73) Assignee: Anthony Crawford Cahan, Pound Ridge, NY (US)

( * ) Notice: Subject to any disclaimer, the term of this patent is extended or adjusted under 35 U.S.C. 154(b) by 1136 days.

(21) Appl. No.: 16/104,685

(22) Filed: Aug. 17, 2018

(65) Prior Publication Data

US 2018/0352874 A1 Dec. 13, 2018

Related U.S. Application Data

(63) Continuation-in-part of application No. PCT/US2017/018543, filed on Feb. 19, 2017.
(Continued)

(51) Int. Cl.
*A41C 3/14* (2006.01)
*A41C 3/10* (2006.01)
(Continued)

(52) U.S. Cl.
CPC .............. *A41C 3/14* (2013.01); *A41C 3/0021* (2013.01); *A41C 3/08* (2013.01); *A41C 3/10* (2013.01);
(Continued)

(58) Field of Classification Search
CPC .......... A41C 3/0021; A41C 3/142; A41C 3/10; A41C 3/08; A41C 5/005; A41C 3/0057;
(Continued)

(56) References Cited

U.S. PATENT DOCUMENTS 2,462,295 A * 2/1949 Wittenberg .............. A41C 3/00
450/53
2,578,954 A 12/1951 Van Leuven, Jr.
(Continued)

FOREIGN PATENT DOCUMENTS

DE 202014005754 U1 8/2014
EP 2196101 A1 6/2010
(Continued)

OTHER PUBLICATIONS

Extended European Search Report in counterpart European Patent Application dated Jul. 5, 2019.
(Continued)

*Primary Examiner* — Katharine G Kane
(74) *Attorney, Agent, or Firm* — Dunlap Bennett & Ludwig, PLLC; Anna L. Kinney

(57) ABSTRACT

A support garment includes a support band extending laterally around the wearer's torso and two cups. Each cup includes a form-fitting enclosure and a cantilevered support form secured to the support band. Each support form has a first and second lateral appendage; a first and second fulcrum; and a medial support structure. The first fulcrum joins an inferior end of the first lateral appendage with a first end of the medial support structure and the second fulcrum joins an inferior end of the second lateral appendage with the second end of the medial support structure. The weight of the breast is transferred by rotational force around each fulcrum through each lateral appendage to the support band across the back of the wearer by way of tension.

21 Claims, 15 Drawing Sheets

Related U.S. Application Data

(60) Provisional application No. 62/297,773, filed on Feb. 19, 2016.

(51) Int. Cl.
*A41C 3/00* (2006.01)
*A41C 3/08* (2006.01)
*A41C 5/00* (2006.01)
*A41D 1/22* (2018.01)
*A41D 7/00* (2006.01)
*B32B 1/00* (2006.01)
*B32B 27/06* (2006.01)
*A41C 3/06* (2006.01)

(52) U.S. Cl.
CPC .............. *A41C 3/142* (2013.01); *A41C 5/005* (2013.01); *A41D 1/22* (2013.01); *A41D 7/00* (2013.01); *B32B 1/00* (2013.01); *B32B 27/06* (2013.01); *A41C 3/0057* (2013.01); *A41C 3/0064* (2013.01); *A41C 3/06* (2013.01); *B32B 2437/00* (2013.01)

(58) Field of Classification Search
CPC .......... A41C 3/0064; A41C 3/06; A41D 1/22; A41D 7/00
USPC ...................................................... 450/52, 53
See application file for complete search history.

(56) References Cited

U.S. PATENT DOCUMENTS

| | | | | |
|---|---|---|---|---|
| 2,621,328 | A * | 12/1952 | Duchnofskey | A41C 3/142 450/53 |
| 2,824,563 | A * | 2/1958 | Hill | A41C 3/0007 450/39 |
| 2,834,352 | A * | 5/1958 | Ullian | A41C 3/144 450/57 |
| 2,851,037 | A * | 9/1958 | Johnson | A41C 3/122 450/47 |
| 2,915,067 | A * | 12/1959 | Bracht | A41C 3/142 450/45 |
| 3,021,844 | A * | 2/1962 | Flagg | A41C 3/10 450/39 |
| 3,021,845 | A * | 2/1962 | Smith | A41C 3/10 450/39 |
| 3,026,227 | A * | 3/1962 | Flagg | D06M 23/14 156/152 |
| 3,154,081 | A * | 10/1964 | Moody | A41C 3/0007 450/53 |
| 3,163,167 | A * | 12/1964 | Chisholm | A41C 3/142 450/53 |
| 3,196,460 | A * | 7/1965 | Haistead | A41C 3/142 2/255 |
| 3,372,698 | A * | 3/1968 | Gingras | A41C 3/00 450/65 |
| 3,446,213 | A * | 5/1969 | Goldman | A41C 3/10 450/39 |
| 4,143,662 | A * | 3/1979 | Fisher | A41C 3/10 450/53 |
| 4,245,644 | A * | 1/1981 | Evans | A41C 3/148 450/52 |
| 4,632,118 | A * | 12/1986 | Garutso | A41C 3/10 450/53 |
| 5,347,656 | A * | 9/1994 | Fabritz | A41C 3/105 2/67 |
| 6,402,585 | B1 * | 6/2002 | Gatto | A41C 3/10 450/53 |
| 6,425,800 | B1 * | 7/2002 | Huang | A41C 3/0007 450/41 |
| 7,377,833 | B1 | 5/2008 | Wanzenboeck et al. | |
| 7,407,428 | B2 | 8/2008 | Fildan et al. | |
| 7,452,260 | B2 * | 11/2008 | Redenius | A41C 3/0021 450/60 |
| 7,497,760 | B2 | 3/2009 | Redenius | |
| 7,607,966 | B1 | 10/2009 | Fox | |
| 8,105,130 | B2 | 1/2012 | Fildan et al. | |
| 8,747,184 | B2 | 6/2014 | Liu | |
| 8,864,549 | B2 * | 10/2014 | McKeen | A41C 3/02 450/51 |
| 9,161,574 | B2 | 10/2015 | Swendseid et al. | |
| 9,867,402 | B2 | 1/2018 | West et al. | |
| 2002/0022432 | A1 * | 2/2002 | Magrone | A41C 3/0014 450/41 |
| 2006/0240743 | A1 | 10/2006 | Mitchell | |
| 2015/0044941 | A1 * | 2/2015 | Luxi | A41C 3/0007 450/41 |
| 2015/0087203 | A1 * | 3/2015 | Turlan-Van Der Hoeven | A41C 3/12 450/93 |
| 2016/0044973 | A1 * | 2/2016 | Lelong | A41C 3/0007 450/45 |
| 2016/0165964 | A1 * | 6/2016 | West | A41C 3/142 450/53 |

FOREIGN PATENT DOCUMENTS

| | | |
|---|---|---|
| FR | 2924901 A1 | 6/2009 |
| JP | H086041 1 A | 3/1996 |
| JP | 2824055 B1 | 11/1998 |
| WO | 2002054894 A1 | 7/2002 |
| WO | 2009028381 A1 | 3/2009 |
| WO | 2009101287 A2 | 8/2009 |

OTHER PUBLICATIONS

International Preliminary Report on Patentability dated Mar. 6, 2018.
International Search Report and Written Opinion dated May 26, 2017.

* cited by examiner

Section A-A

SUPPORT GARMENT WITH CANTILEVERED SINUSOIDAL SUPPORT FORM

CLAIM FOR PRIORITY

This Non-Provisional patent application is a continuation-in-part of International Application No. PCT/US2017/018543, filed Feb. 19, 2017, published Aug. 24, 2017 as WO/2017/143312. International Application No. PCT/US2017/018543 was based on U.S. Provisional Patent Application Ser. No. 62/297,773, filed on Feb. 19, 2016. Priority to both International Application No. PCT/US2017/018543 and U.S. Provisional Application No. 62/297,773 is hereby claimed and the disclosures of both applications are herein incorporated by reference.

BACKGROUND OF THE INVENTION

In larger-breasted women with significant ptosis, existing brassiere and breast support garment designs do not adequately lift the lower portion of the breasts away from the chest wall. This results in the buildup of heat and perspiration in the central inframammary region which, in turn, can result in uncomfortable fungal infections and rashes requiring treatment. Conventional underwires provide little to no support to address supplemental forces present during moderate to high activity. In addition, existing breast support garments generally have a support structure in contact with specific areas that are common location for incisions, for example, as a result of mastectomy or breast reduction surgery. In certain post-operative settings, scarring is more likely to occur due to contact with abrasive and non-breathable materials.

The general structure of the human breast is illustrated in FIGS. 1A and 1B for reference. In an upright position, the center of mass 20 of the human breast 10 can be several centimeters in front of the chest wall 12 depending on the breast size. The nipple areolar complex 14 in most cases represents the most distant portion of the breast from the plane of the chest wall 12. As the base of the breast is fixed to the chest wall 12, the portion of the breast mass extending outward acts as a lever arm at the center of mass 20. Forces 60 (as shown in FIGS. 2, 3, and 5) created by activities such as walking, running, jumping, and horseback-riding result in repeated vertical acceleration/deceleration of the breast center of mass 20. The theoretical lever arm is fixed at a point at which the chest wall 12 intersects with horizontal plane 21 at plane A-A, shown in FIG. 1B. The center of mass 20 is located at the intersection of plane A-A with vertical axis of force 23 and horizontal plane 21. The distance 22 from the chest wall to the center of mass is illustrated in FIG. 1A.

If the human breast, viewed from the side, is idealized as a hemisphere of uniform density with its axis in the horizontal plane, the center of mass, $X_c$, will be ⅜ of the radius from the chest wall, as calculated below.

$$M = 2/3\pi R^3 \rho,$$

where:
M=Mass of hemisphere
R=radius of hemisphere, and
ρ=density of hemisphere $$m = \int_0^R \pi(R^2-x^2)(x)dx$$

where:
m=moment and
x=distance from plane $$X_c = m/M$$

As the differential moment approaches zero, $X_c \approx 3/8$ R.

Viewed from the front, by symmetry, the center of mass lies in the middle of the hemisphere directly behind the nipple/areolar complex.

In actuality, the human breast is far from uniform in density. In most cases, the glandular and more dense tissue (as opposed to less dense fatty tissue), is asymmetrically located farther from the chest wall in the region behind the nipple/areolar complex. This has the effect of moving the center of mass farther out from the chest wall.

Existing brassiere and breast support garment designs seek to provide support and dampening of these forces by enclosing the breast in a close-fitting fabric and/or molded and/or foam and/or contour cup attached to an elastic vertical strap that extends over the shoulder and which are attached to the band encircling the torso. Some brassiere and breast support garment designs include two-dimensional U-shaped metal or plastic underwires stitched into the lower edge of each cup of the brassiere or breast support garment such that when the brassiere or breast support garment is in place, the underwires lie flat against the chest wall. When the brassiere or breast support garment is worn, the underwire defines the inferior base and the side of the cup adjacent to the ribcage. As the center of mass of the breast is in front of this, the underwire contributes little to vertical support and force dampening. The majority of these effects are therefore borne by the cup, through the vertical straps, to the shoulders. Over time, this can result in an uncomfortable condition of the shoulders called "notching." Several attempts have been made to address the shortcomings of a two-dimensional underwire, including US 2015/0087203 to Turlan-Van Der Hoeven, U.S. Pat. No. 8,747,184 to Liu, U.S. Pat. Nos. 7,407,428 and 8,105,130 to Fildan et al., U.S. Pat. No. 7,377,833 to Wanzenboeck et al., and U.S. Pat. No. 7,607,966 to Fox.

Other prior art references disclose main support structures that lie in the conventional position of an underwire at the inframammary fold or are to be used as a shape enhancer or support in conjunction with an underwire bra, such as U.S. Pat. No. 9,161,574 to Swenseid, U.S. Pat. Nos. 7,452,260 and 7,497,760 to Redenius, US2016/0165964 to West et al., and US 2015/0044941 to Luxi et al.

Garments that lift and reshape breasts to accentuate breast volume and cleavage generally result in regions of the breast and surrounding chest that receive poor air circulation and moisture removal. U.S. Pat. No. 8,864,549 to McKeen teaches a bustier with a support structure and/or flexible structure. The McKeen support structure has a caudal conformation, with a fulcrum superior, or craniad, to the support element coming off the chest wall. This creates a posterior force in the lateral vertical element, which in turn requires counterforce with a circumferential band on the front of the wearer's chest.

There remains a need for a support garment that addresses aeration of infection-prone regions of the wearer's chest, promotes breast healing after medical procedures, and dampens vertical forces on the breast during moderate to high physical activity.

SUMMARY OF THE INVENTION

There is provided in accordance with the present invention a support garment that provides lift, support, and cushioning of the breast. This design is a novel support form configured to support the breasts directly under their center of mass in a way that conventional U-shaped underwires cannot do. As a result of the novel shape and positioning of the support form, the breast weight and acceleration is assumed by the support form, leading to less force being transferred to the shoulders. This reduces motion and weight-associated breast discomfort. Additionally, the invention better lifts the breasts off of the chest wall/ribcage, affording improved aeration which decreases temperature and perspiration in the inframammary fold. Thus, a support garment according to the present invention provides increased comfort and reduced fungal infections and rashes.

The support garment according to the invention comprises a support band extending laterally around the wearer's torso and two cups, each having a form-fitting enclosure. Each cup further comprises a cantilevered sinusoidal support form having a first and a second lateral appendage; a first and a second fulcrum; and a sinusoidal medial rib. The first fulcrum joins the first lateral appendage with a first end of the sinusoidal medial rib and the second fulcrum joins the second lateral appendage with the second end of the sinusoidal medial rib. One of the lateral appendages of each cantilevered sinusoidal support form is secured to the cup or to the support band adjacent to each cup such that the support garment is effective to transfer the weight of a breast to the torso of a wearer.

Other aspects and advantages of the present invention are described in the detailed description below and in the claims.

BRIEF DESCRIPTION OF THE DRAWINGS

The invention is described in detail below with reference to the appended drawings, wherein like numerals designate similar parts. In the Figures.

DETAILED DESCRIPTION OF THE INVENTION

Figure 1B:
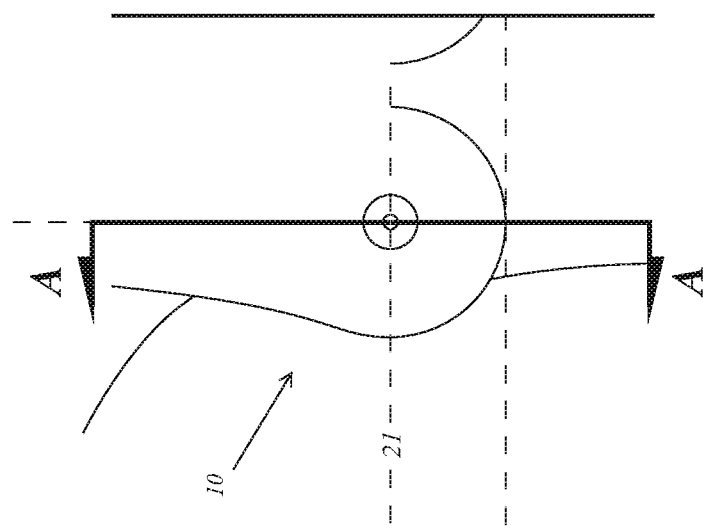
FIGS. 1A and 1B illustrate the center of mass in an idealized breast, with FIG. 1A showing a cross-section at line A-A.

The invention is described in detail below with reference to several embodiments and numerous examples. Such discussion is for purposes of illustration only. Modifications to particular examples within the spirit and scope of the present invention, set forth in the appended claims, will be readily apparent to one of skill in the art. Terminology used herein is given its ordinary meaning consistent with the exemplary definitions set forth immediately below.

With respect to the various ranges set forth herein, any upper limit recited may, of course, be combined with any lower limit for selected sub-ranges.

The transitional phrase "consisting essentially of" limits the scope of a claim to the specified materials or steps "and those that do not materially affect the basic and novel characteristic(s)" of the claimed invention. As used herein with respect to product claims, "consisting essentially of" and like terminology refers to the recited components and excludes other ingredients which would substantially change the basic and novel characteristics of the composition or article. Unless otherwise indicated or readily apparent, an article consists essentially of the recited components when the article includes 90% or more by weight of the recited components. That is, the terminology excludes more than 10% unrecited components.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As used herein, the term "support form" refers to a structural element for use with or for incorporation into any part of any kind of a brassiere or garment that provides support for the breasts (as an example, foam or molded or contour cups). The term is not meant to be limiting, as the inventive support form is not limited to the position and location in which a conventional underwire is typically found. The inventive support form may be made of any number or combination of materials. These distinctions and more will be apparent in the context of the following detailed description.

The term "hammock-like plane of support" as used herein, also described as a "suspension element", is not intended to be limited to a 2-dimensional, flat, planar surface, but is rather intended to include a moderately curved, 3-dimensional surface that lies in direct apposition to the breast surface, approximating the surface of a spherical cap.

The following terms indicating direction are used herein. "Craniad" as used herein means toward the head end of the wearer. "Caudal" or "caudad" means towards the lower end of the wearer. "Posterior" means toward the back. "Medial" as used herein means towards the center. "Lateral" means towards the side (left or right). Thus, a "medial limb" refers to an element of the support form extending upward in the area between the breasts and is sometimes also referred to as a "lateral appendage", meaning that the appendage is positioned to the side of the breast. "Proximal" means toward a joint or junction. "Distal" means toward an extremity of the element. "Posteroanterior" as used herein means from the back toward the front of the wearer. As used herein, "inferior" refers to a lower position on the garment as determined on a wearer in an upright position.

A "support band" according to the present invention refers to any strap or structure joining a support garment across the back of a wearer. The support band may be unitary or may have two sections joined by clasps, hooks, etc.

As used herein, a "cup" may include a collapsible fabric structure having an approximately hemispherical shape when a breast is placed therein as well as a pre-formed structure that maintains an approximately hemispherical shape even when not in use; a "cup" may also include structures that cover the entire surface of the breast or only a fraction of the breast surface when in use, such as a demi-cup, for example. A "molded cup" refers to an unlined cup that is pre-shaped and designed to mirror the natural shape of the breast. A "contour cup" is similarly pre-shaped but further comprises padding or lining.

The term "idealized" refers to a hemispherical shape that approximates a human breast, as well as the associated radius and arc length from chest wall to an apex at the nipple areolar complex, and/or to a mass of uniform density approximating the human breast mass. In actuality, human breasts generally do not exhibit a truly hemispherical shape, particularly ptotic breasts. Nor do human breasts generally exhibit uniform density throughout the mass.

As used herein, the "theoretical center of mass" refers to the center of mass of an idealized breast. See FIGS. 1A and 1B and the associated description, above.

As used herein, the term "sinuosity" refers to a continuous, curving structure having at least one bend or direction change therein. Each end of the sinuosity defines a branch, which is seamlessly joined to the remaining support structure by way of the fulcrums. In most embodiments, the at least one bend defines at least one peak, which curves such that in use, the peak or peaks extend vertically upward, and horizontally outward, away from the chest wall and towards the apex or horizontal middle of an idealized breast. As used herein, a "peak" refers to the point at which a curve exhibits a maximum distance from the wearer's chest wall. The height of the peak describes the distance from the chest wall to the peak point in terms of an arc of a circle and may range from 1.8 cm to 20 cm, depending in large part upon the associated cup size. When more than one peak is present, a trough or troughs are defined therebetween. Each trough may have a height less than or equal to the height of one of the adjacent peaks, similarly defined as the distance from the chest wall to the base of the trough in terms of an arc of a circle.

The term "support form" as used herein refers to a three-dimensionally-shaped article that acts as a brace or frame, reinforcing the shape of the garment and providing support to the wearer's breast, holding the breast in the desired position.

The support form presented herein when incorporated into a support garment, such as a brassiere, swimsuit, or yoga/sport top with built-in bra, provides support and cushioning for the breasts by a different mechanism than conventional support garments. In contrast to existing underwires whose shapes lie within a two-dimensional plane against the chest wall, a medial portion of the novel support form described bends upward and outward from the chest wall, creating a three-dimensional undulation(s) that parallels the convex undersurface of the breast.

The novel three-dimensional shape and recoil properties of this design create lift and support by cradling the breast from beneath around its center of mass. This results in the following enhancements over existing designs: 1) transference of part or all of the breast's weight, through a cantilever effect, to the wearer's back and away from the shoulders; 2) dampening of downward acceleration due to the cantilever effect and expansion and recoil in the horizontal/circumferential direction; 3) increased separation between the inferior breast and chest wall; and 4) improved aeration that would decrease temperature and perspiration in the inframammary fold area and between the breasts. In addition, the enhanced cradling and shock absorbing effects of the present support form design may be especially beneficial to female athletes and military personnel, as well as individuals with augmentation or reconstructive implants in whom the breast center of mass may be particularly distant from the plane of the chest wall. Since the present support form does not lie in the central inframammary fold, this design may also find application in those women who have had surgical incisions in that area, such as but not limited to reduction mammoplasty, breast biopsies, and partial mastectomies. In contrast to the horizontal rigidity of existing underwires, the circumferential flexibility of the present design can accommodate different breast shapes and sizes. This design may prove beneficial for those women with breast size/shape asymmetry. In the manufacturing process, this flexibility allows a broader range of breast sizes to fit within a smaller range of brassiere and/or breast support garment sizes, resulting in reduced production costs.

As compared to existing rigid, U-shaped underwires, the present design provides better dampening of repeated downward acceleration/deceleration associated with walking, running, jumping, horseback riding, or other activities that result in repeated vertical movement of the torso. This shock-absorbing effect is achieved through two means: 1)

the inherent springiness of the lateral portion of the support form, acting as a cantilever in conjunction with the elasticity of the garment's fabric or material into which the support form is incorporated or attached, work in concert to resist downward deflection, and once deflected, to return to the starting position; 2) expansion and recoil in the horizontal/circumferential direction of the support form material at the undulation(s) in conjunction with a hammock-like plane of support fabric or material underlying the breast center of mass bridging the area between the limbs of the undulation(s). Expansion of the garment's horizontal circumference will cause the width of the undulation(s) to increase, causing tension in the intervening fabric or material to rise and resulting in a lifting force on the breast. These actions together provide a superior level of support and shock absorption over existing designs, especially during vigorous activity and accentuated respiration.

The invention provides a dynamic structure designed to flex and twist under the weight and movement of the wearer's breast and body and accommodate different forces of the individual wearer. It is also designed to accommodate a broader range of sizes within one size of the support form. The inventive support garment provides the following advantages:
   a) optimizes the smooth transmission of force of the breast weight to the support form;
   b) distributes breast weight over a broad surface area;
   c) creates a tapered cross-section that when incorporated into the garment (cup) will disguise its presence.

The inventive support form lifts the breast mass from the inframammary fold without the need to transfer weight to a shoulder strap. As such, the invention contemplates strapless support garments as well as garments comprising shoulder straps. The present invention also moves the support structure away from the inframammary fold and obviates the need for any circumferential support band beneath the garment on the anterior chest wall.

In the inventive support form, the fulcrum is inferior to the medial support structure extending from the chest wall, i.e., the support form exhibits a craniad conformation. The force of the weight of the breast creates a torque which when transmitted to the lateral vertical element creates a force forward, which is counteracted by the circumferential band on the wearer's back, away from the inframammary area. Due to the novel structure, there is no need for additional supporting elements in the inframammary area, resulting in improved aeration and moisture management in this region. The craniad conformation of the invention surprisingly provides superior support, force dampening, and aeration as compared to a conventional garment with underwire as well as a conventional strapless support garment, such as a bustier. At the time of the invention, support garments generally comprise a conventional underwire or require additional support from a band or like element to provide support and shape. Existing support garments without shoulder straps generally need further support below the breasts. The invention also introduces lateral flexibility into the support structure to dampen vertical movement during activity.

The support form provides support without significant mechanical pressure to regions in the inframammary fold and the underside of the breast. These regions, as well as the area between the breasts, are particularly prone to infection without exposure to air. The inventive garments allow air to reach these areas, preventing infection. These embodiments also allow for garments that better accommodate, e.g., the needs of a patient recovering from certain medical procedures, such as surgical incisions below the nipple and within the inframammary fold. Such incisions may result, for example, from a reduction mammoplasty.

The medial horizontal strap may be a noncontinuous clasp or junction between the garment cups as the strap only serves as a mechanical connection over the sternum to join two halves of the garment and to hold the garment around the wearer. In some embodiments, a garment is provided without a band or strap between breast-supporting cups, as the garment does not require the medial strap to support breast weight which is transferred to the back of the garment.

The dimensions of the support form may vary, as may the stiffness or rigidity of its components. Its width and thickness may vary. For example, the width of the support form, between the upper edge and the lower edge, may vary from a few millimeters to over a centimeter, and may also vary along its length. The thickness may vary from about 0.5 mm to about 15 mm or more, which may also vary across the support form. For example, the thickness may be at least about 1 mm and less than about 10 mm. A suitable thickness may be about 1 mm to about 5 mm, such as about 2 mm.

The support form stiffness, or rigidity, is a function of the material selected and the thickness employed. The rigidity may vary along its width and length as well. Durometer, a unitless measure of hardness, may range from about 10 "Shore OO" to about 100 "Shore D".

Hardness values may be, in some embodiments, durometers of at least about 15 "Shore OO", at least about 20 "Shore OO", at least about 30 "Shore OO", at least about 70 "Shore OO", at least about 25 "Shore A", or at least about 55 "Shore A". Hardness values may also be, for example, durometers of less than about 75 "Shore D", less than about 50 "Shore D", less than about 100 "Shore A", less than about 90 "Shore A", less than about 80 "Shore A", or less than about 70 "Shore A". A suitable durometer may be, for example, between about 50 and about 80, such as about 60.

The support form may be formed in a plurality of sizes to fit a plurality of brassiere or breast support garment wearers.

Without being bound by theory, the fundamental principle of the invention is that the geometry of the support form supports the force of the breast center of mass in the vertical position. Therefore, the support form and its elements must have dimensions that accommodate a breast center of mass whose position may vary from less than ⅜ of the radius to just short of the idealized breast radius.

The inventive support form is provided with a medial limb and a lateral limb. Generally, the medial limb is shorter than the lateral limb, though in some instances the limbs may be the same length.

Since the medial and lateral limbs of the support form lie roughly in the same area as the corresponding components of an underwire of the same size in a conventional brassiere, the range of medial to lateral dimensions for the support form is roughly equivalent to the underwire diameters used in various cup sizes, as listed in Table I.

TABLE I

Underwire Diameters for Various Bra Cup Sizes

| UW[1] Size | Cup Size (US System) | | | | | | | | UW[1] Diameter[2] (cm) |
|---|---|---|---|---|---|---|---|---|---|
| 30 | 32A | 30B | 28C | | | | | | 9.7 |
| 32 | 34A | 32B | 30C | 28D | | | | | 10.6 |
| 34 | 36A | 34B | 32C | 30D | 28E | | | | 11.4 |
| 36 | 38A | 36B | 34C | 32D | 30E | 28F | | | 12.3 |
| 38 | 40A | 38B | 36C | 34D | 32E | 30F | 28G | | 13.1 |
| 40 | 42A | 40B | 38C | 36D | 34E | 32F | 30G | 28H | 14 |
| 42 | 44A | 42B | 40C | 38D | 36E | 34F | 32G | 30H | 28I | 14.8 |
| 44 | 44B | 42C | 40D | 38E | 36F | 34G | 32H | 30I | 28J | 15.7 |
| 46 | 44C | 42D | 40E | 38F | 36G | 34H | 32I | 30J | 28K | 16.5 |
| 48 | 44D | 42E | 40F | 38G | 36H | 34I | 32J | 30K | 28L | 17.4 |
| 50 | 44E | 42F | 40G | 38H | 36I | 34J | 32K | 30L | 28M | 18.2 |
| 52 | 44F | 42G | 40H | 38I | 36J | 34K | 32L | 30M | 28N | 19 |
| 54 | 44G | 42H | 40I | 38J | 36K | 34L | 32M | 30N | 28O | 19.9 |
| 56 | 44H | 42I | 40J | 38K | 36L | 34M | 32N | 30O | 28P | 20.7 |
| 58 | 44I | 42J | 40K | 38L | 36M | 34N | 32O | 30P | | 21.6 |
| 60 | 44I | 42J | 40K | 38L | 36M | 34N | 32O | 30P | | 22.4 |

[1]UW = Underwire
[2]Diameters are approximate, as shapes may vary

Table II lists the idealized distances from the chest wall to the breast apex for the various cup sizes. These distances define the maximum dimensions of the support form and its elements according to cup size.

TABLE II

Idealized Distance from Chest Wall to Breast Apex

| UW[1] Size | Cup Size (US System) | | | | | | | | Distance[2] (cm) |
|---|---|---|---|---|---|---|---|---|---|
| 30 | 32A | 30B | 28C | | | | | | 4.9 |
| 32 | 34A | 32B | 30C | 28D | | | | | 5.3 |
| 34 | 36A | 34B | 32C | 30D | 28E | | | | 5.7 |
| 36 | 38A | 36B | 34C | 32D | 30E | 28F | | | 6.2 |
| 38 | 40A | 38B | 36C | 34D | 32E | 30F | 28G | | 6.6 |
| 40 | 42A | 40B | 38C | 36D | 34E | 32F | 30G | 28H | 7.0 |
| 42 | 44A | 42B | 40C | 38D | 36E | 34F | 32G | 30H | 28I | 7.4 |
| 44 | 44B | 42C | 40D | 38E | 36F | 34G | 32H | 30I | 28J | 7.9 |
| 46 | 44C | 42D | 40E | 38F | 36G | 34H | 32I | 30J | 28K | 8.3 |
| 48 | 44D | 42E | 40F | 38G | 36H | 34I | 32J | 30K | 28L | 8.7 |
| 50 | 44E | 42F | 40G | 38H | 36I | 34J | 32K | 30L | 28M | 9.1 |
| 52 | 44F | 42G | 40H | 38I | 36J | 34K | 32L | 30M | 28N | 9.5 |
| 54 | 44G | 42H | 40I | 38J | 36K | 34L | 32M | 30N | 28O | 10.0 |
| 56 | 44H | 42I | 40J | 38K | 36L | 34M | 32N | 30O | 28P | 10.4 |
| 58 | 44I | 42J | 40K | 38L | 36M | 34N | 32O | 30P | | 10.8 |
| 60 | 44I | 42J | 40K | 38L | 36M | 34N | 32O | 30P | | 11.2 |

[1]UW = Underwire
[2]Distance is calculated as underwire diameter/2

Therefore, the peak or peaks of the support form medial support structure distal from the chest wall extends from about 1.8 cm up to about 12 cm outward from the chest wall, or more in some cases, depending upon the wearer's breast size. The medial support structure does not contact the inframammary fold. The support form, when positioned on a wearer, extends vertically no higher than the nipple region of the breast.

Each fulcrum is configured such that, prior to the application of load, the lateral appendage arising from the fulcrum and extending out onto the breast, as viewed from the side, creates an angle of between about ½° and about 90° to the proximal end of the medial support structure.

In any case, the fulcra lie proximal to the chest wall, closer to the chest wall than the breast center of mass. In an upright position, the fulcra lie in a horizontal plane below the position of the support form peak(s).

According to the invention, the load provided by a breast produces a compressive force, pushing the fulcra down and back. As the fulcra will be subject to the forces being transferred, the fulcra may be manufactured of enhanced materials or dimensions or otherwise be provided with properties that provide increased strength.

In some embodiments, the support form is provided with elements that extend into the inframammary fold.

To improve aeration as well as heat and moisture management, the support form may be fenestrated with multiple openings of different sizes, spacing, and shapes. This function may, in some cases, be achieved using a porous material having a pore size sufficiently large to allow dissipation of water vapor and the passage of oxygen.

In some embodiments, the support form is encased in a fenestrated foam or molded/contour cup that is incorporated into the final garment.

In addition to the various overall shapes described, the support form may have various geometries along its length, from smooth-edge, ribbon-like shape, to repeated phalanx-like tapered projections extending out from either or both edges. These projections may be along a part of or the entire length of the form. The projections may vary in size, stiffness/rigidity and location. The projections are generally tapered in both thickness and length. The number of projections is dependent, in part, upon the dimensions (e.g., length, width, thickness, degree of taper) of the projections.

Additional geometries of the support form include one or more undulations of various sizes and degrees. The size and number of undulation(s) may be altered to accommodate different breast anatomies, including different configurations in the same brassiere; i.e., left differs from right. The criteria for increasing or decreasing the number of undulations, and the width, shape, and spacing of the undulations, may be determined by the individual support needs of different breast anatomies. For example, larger, broader breasts may require an increased number of undulations and/or wider spacing of undulations, whereas smaller, narrower breasts may require fewer undulations and/or less spacing. In embodiments having multiple undulations, the top and bottom surfaces of the support form may resemble sine or cosine waves in phase.

The fabric or other material underlying the breast center of mass between the limbs of the support form creates a hammock-like plane of support, thereby distributing the breast weight over a broad surface area. The force created by the weight of the breast on this region is borne by the hammock-like support, or flexible fenestrated membrane, and transferred laterally through the support form, acting as a cantilever, to the lateral limb lying along the side of the chest wall. In this manner, the hammock-like membrane creates a broader distribution of the weight of the breast onto the structural element, which is then transferred to the wearer's back.

The material of the hammock-like plane of support may include textile and non-textile materials, including materials identical to that of the support form itself. The material may include, but is not limited to, a thin, fenestrated or non-fenestrated membrane or mesh, such as a medicinal membrane or gauze, either incorporated into the support form as one piece or added as a separate component. As such, the inventive garment may provide support while promoting healing of incisions and/or infections.

This support form may be manufactured from pliable and resilient material that allows the support form to return to its original shape despite significant deformation, deflection or twisting. The support form may be made from, but not limited to, the following materials: steel or other metal, including wire; plastic, i.e., natural and synthetic organic polymers in the form of resin, composite, gel, foam, elastic, spandex, fabric, compound elastomer resins, plasticized rigid PVC compounds, polyolefin reticulated compounds, polyolefinic reticulated compounds, a closed-cell resin, an ethylene vinyl acetate (EVA) material, rubber, or foam rubber; silicon-based materials including silicone or silica gel; other shape-memory material that has spring-like properties; and/or some combination thereof. It may also be comprised of an appropriately shaped gas-filled or fluid-filled tube.

In cross section, the support form may be flat, circular, oval, or complex polygonal. It may be solid or hollow. The cross-sectional shape and area may change along the course of the support form to achieve different degrees of recoil, flexibility, and stiffness/rigidity.

The support form according to the invention may be used with traditional lingerie textiles, fabrics, and material, or with performance-enhancing and/or technologically-advanced/high-tech/nanotech/smart-fabric textiles and materials suitable for use in a garment to be worn against the body to overcome at least some of the deficiencies exhibited by some of those of attempted previous solutions.

Furthermore, connection of the support form into the brassiere and/or breast support garment includes methods used in existing brassiere or breast support garment construction whereby the support form is encased in a channel or tube and stitched into the brassiere, brassiere cups, or breast support garment, as well as anchored, connected, or supported by alternative securing means whereby the support form is attached to the inner or outer portion of the brassiere, brassiere cup, or breast support garment with snaps, hooks, and similar devices. For example, securing means may include sewing, chemical bonding, gluing, and/or heat bonding. Similarly, the inventive support form may be attached externally to a conventional brassiere or breast support garment already having a conventional U-shaped underwire. In some embodiments, the support form may be glued, bonded, or otherwise encased between layers of foam, pad, fabric, 3D spacer fabric or other cup materials used to make brassiere and breast supporting garment cups. The support form may also be manufactured directly into the material of the brassiere or breast support garment as, for example, by 3D printing.

The support form may be a gas-filled or fluid-filled tube that forms the support form and is incorporated into the brassiere and/or breast support garment by any of the methods mentioned above.

In some embodiments, the support garment is provided with an internal textile layer and an external textile layer. However, in other embodiments, one or both textile layers are not necessary and are thus excluded.

The support form and/or the material underlying the breast center of mass may be fabricated of materials including, but not limited to, performance-enhancing and/or technologically-advanced/high-tech/nanotech/smart-fabric textiles and/or other materials that preferably include one or more of the following features: wicking, evaporation or other moisture management capabilities, anti-microbial characteristics, and pH-control properties.

Figure 1A:
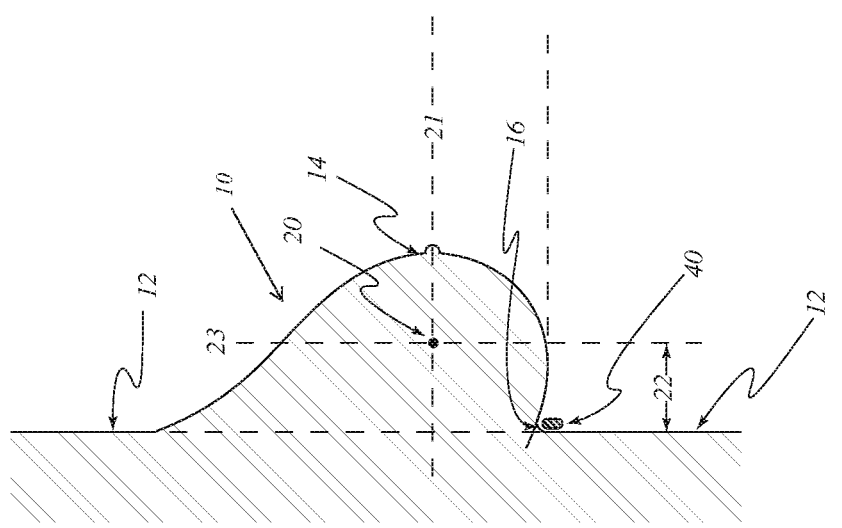

FIGS. 1A and 1B demonstrate the theoretical position of the breast center of mass 20 and the location in which a conventional underwire 40 lies within the inframammary fold 16. The breast center of mass 20 is theoretically positioned at the intersection of the vertical plane A-A intersecting the nipple areolar complex 14, the horizontal plane 21 intersecting the nipple areolar complex, and the vertical axis of force 23 a distance 22 from the plane of the chest wall 12.

Figure 2:
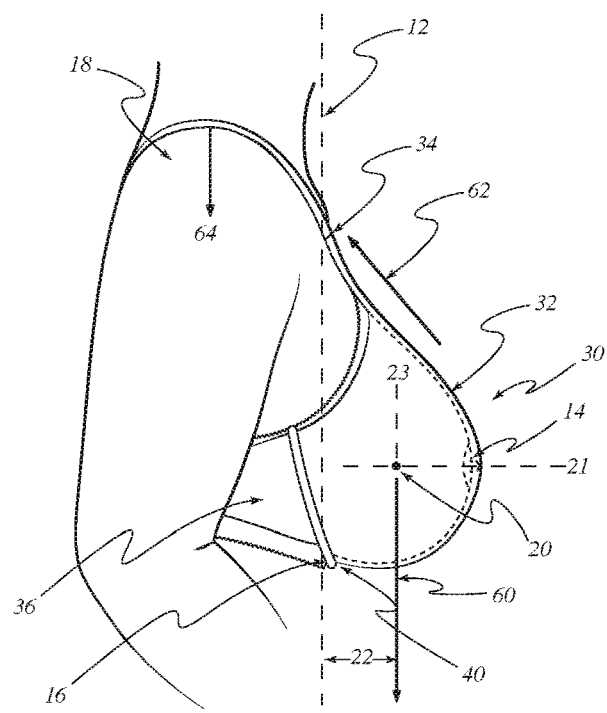
FIG. 2 depicts a right elevation of a conventional brassiere with underwire.

FIG. 2 demonstrates the force transfer provided by a conventional brassiere with underwire. In the Figure, a support garment such as a brassiere 30 is positioned on a wearer such that the breast and nipple areolar complex 14 are contained within a cup 32, support for which is provided by underwire 40 positioned at the inframammary fold 16 at the chest wall 12. The brassiere is secured by way of a lateral posterior horizontal strap 36 that circles around the wearer's back, as well as a vertical strap 34 that extends across the wearer's shoulder 18. The vertical gravitational force 60 acting upon the breast is counteracted by force 62 exerted on the shoulder strap 34, transferring the force due to the weight of the breast to force 64 exerted on the wearer's shoulder 18.

Figure 3:
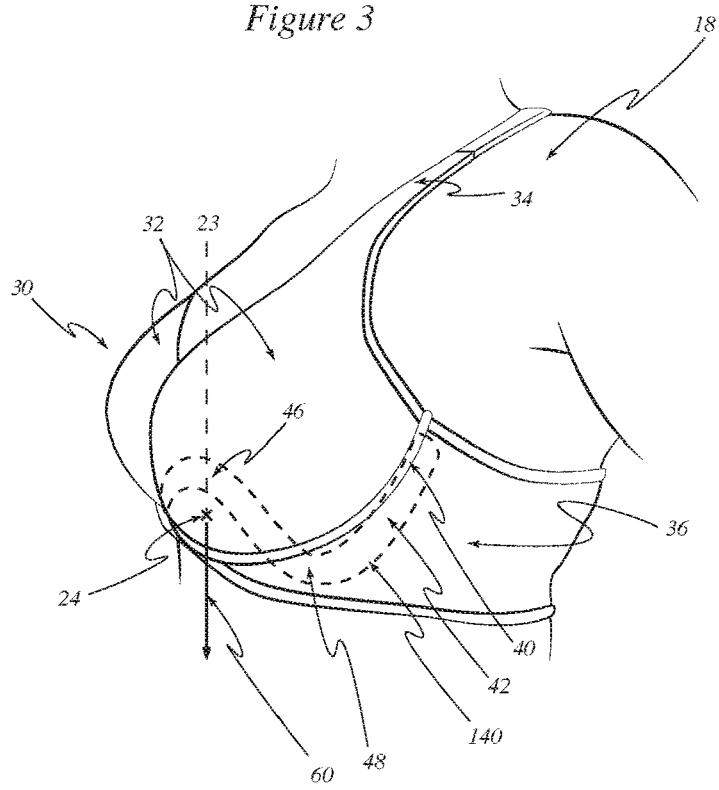
FIG. 3 is a perspective view of a brassiere, illustrating differences between a support form of the present invention as compared to a conventional underwire.

FIG. 3 illustrates the different configuration of the inventive support form 140 as compared to a conventional underwire 40. The inventive support form is shown in more detail in FIG. 4. As shown in FIG. 3, the breast center of mass 20 is projected vertically onto a surface of the garment 30 by force 60 at projection point 24.

Figure 4:
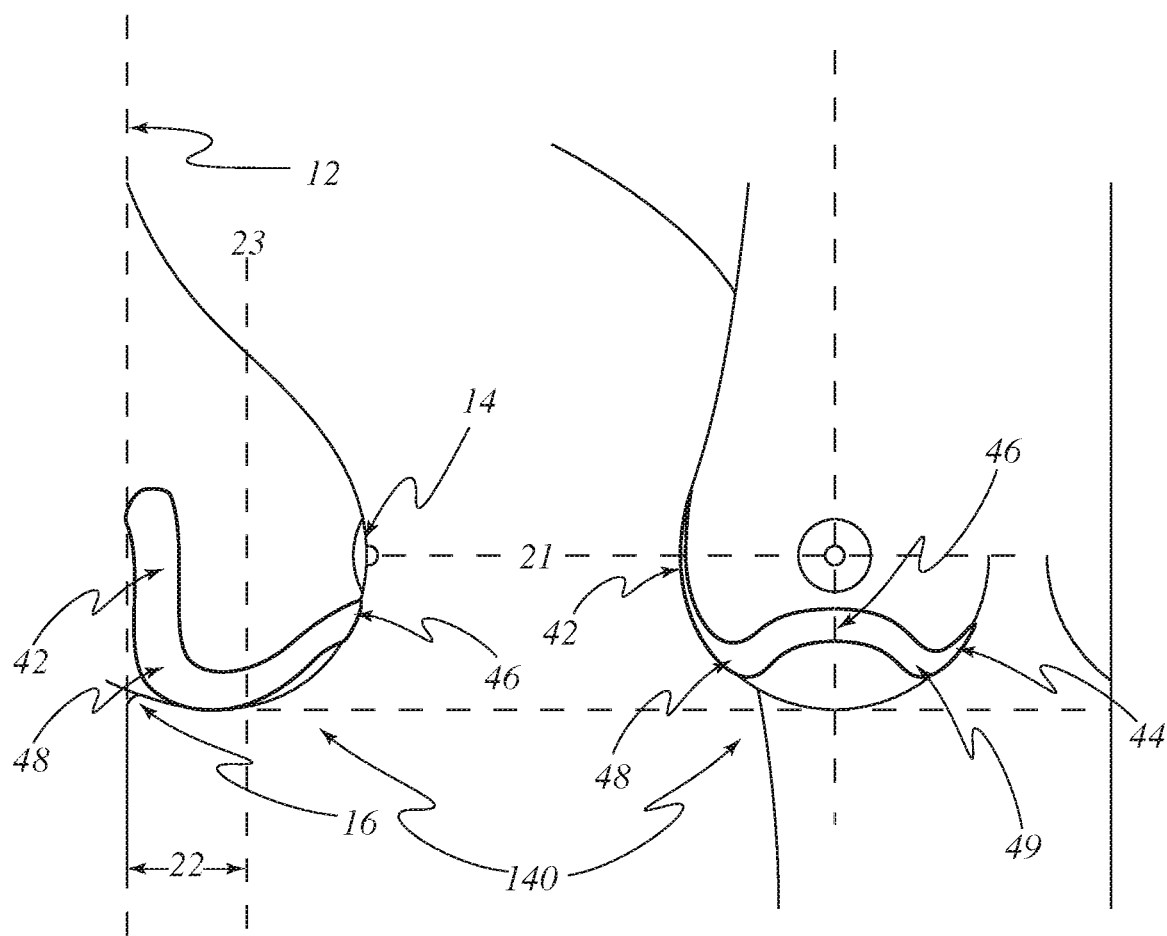
FIG. 4 is a right elevation and a front elevation of an embodiment of the inventive support form illustrating the position of the support form on the wearer.

FIG. 4 illustrates a support form 140 according to the invention without the surrounding support garment 30 and demonstrates the position of the support form 140 on the wearer's breast. The support form 140 generally has a medial support structure or rib 46 with an undulating or sinusoidal peak or peaks positioned craniad, communicating with a lateral limb or appendage 42 via a lateral fulcrum 48 and communicating with a medial limb or appendage 44 via a medial fulcrum 49, such that the fulcrums 48, 49 are positioned caudally and the distal end of the lateral limbs 42, 44 extend craniad. The lateral and medial limbs 42, 44 of the support form 140 follow the curvature of the base of the breast and the fulcrums 48, 49 lie adjacent to the inframammary fold 16. The peak(s) or undulation(s) of the medial support structure 46 extends upward and outward from the chest wall 12 to a location between the nipple-areolar complex 14 and the vertical axis of force 23 associated with the breast center of mass, laterally midway across the breast. In other words, the medial support structure 46 encircles or borders a lower region of the breast when the wearer is in a vertical position, providing direct support to the area when incorporated into a support garment 30. For convenience, the support form illustrated in FIG. 4 is described herein as the "Wave Configuration".

Figure 5:
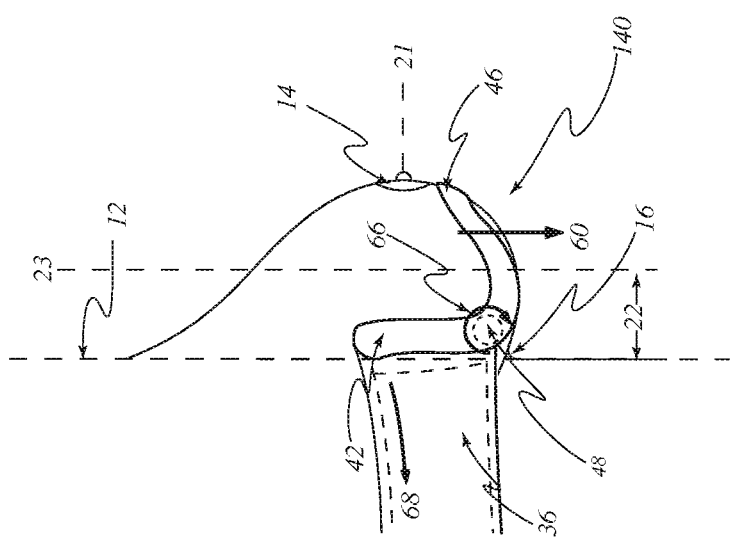
FIG. 5 is a right elevation of a partial garment according to the invention, illustrating the transfer of forces provided by the invention to the back strap of the wearer.

As demonstrated in FIG. 5, the force 60 created by the weight of the breast is transferred laterally through the support form 140, acting as a cantilever, to the lateral limb 42 lying along the side of the chest wall 12 via a torque force 66 at the fulcrum 48, where the distance from the fulcrum 48 to the axis of the vertical force 60 functions as a moment arm. Lateral limb 42 experiences a forward rotational action counteracted by the fabric of the lateral band 36 wrapped around the wearer's torso, thereby transferring the force 68 to the wearer's back. In turn, some or all of the vertical forces 60 on the breast are redirected to the back and away from the shoulder 18.

Figure 6:
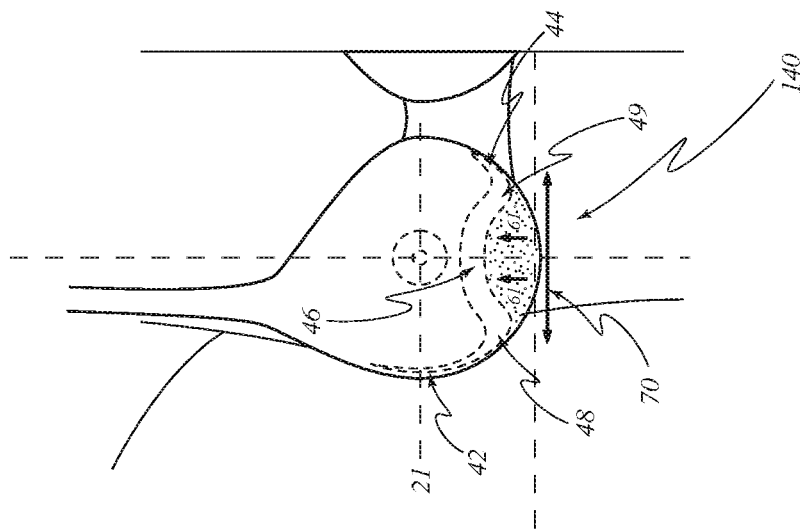
FIG. 6 is a front view of an inventive brassiere, illustrating the vertical force dampening effect provided by expansion of the support form.

A support garment with the inventive support form 140 additionally provides superior vertical force dampening characteristics, as illustrated in FIG. 6, due to the flexibility and expandability of the sinusoidal design. The material underlying the breast center of mass 20 between the limbs 42, 44 of the support form 140 distributes the breast weight over a broad surface area. When a vertical force is exerted on the support form 140, it will temporarily expand; i.e., the distance between fulcra 48 and 49 will increase. Expansion is indicated by 70. Expansion of the garment's horizontal circumference causes tension in the intervening material, resulting in a lifting force 61 on the breast. Thus, the increased vertical force is transferred laterally through the support form 140. Once the amplitude of the force decreases, the support form 140 and garment material recoil in the horizontal/circumferential direction.

Figure 7:
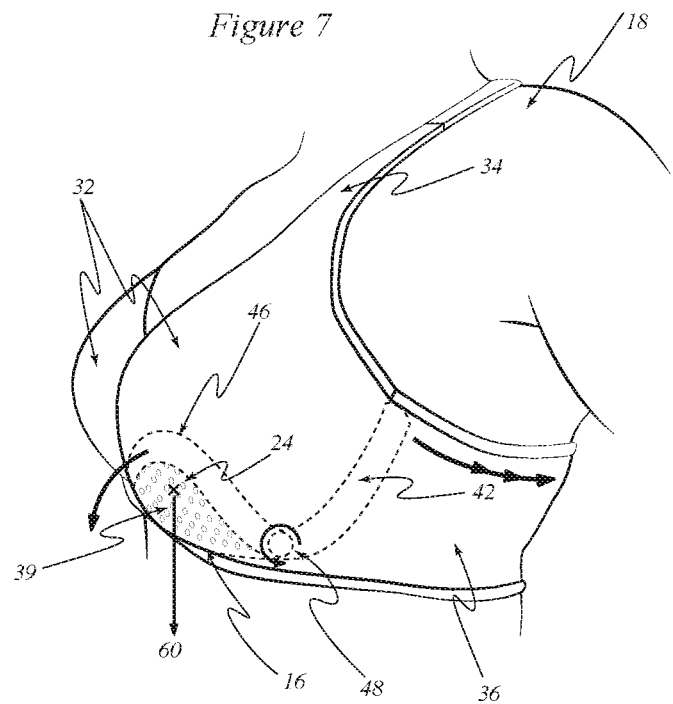
FIG. 7 is a perspective view of a garment according to one embodiment of the invention, illustrating the transfer of forces to the wearer's back.

FIG. 7 illustrates a support garment 30 for which additional support is provided by a hammock-like plane of support or suspension element 39 which may extend from the peak of the undulation 46 downward and inward to the inframammary fold 16. In FIG. 7, the hammock-like plane of support 39 is shown as a perforated, fenestrated, or porous material. The function of the support form illustrated in FIG. 5, discussed above, is additionally illustrated in FIG. 7.

Figure 8:
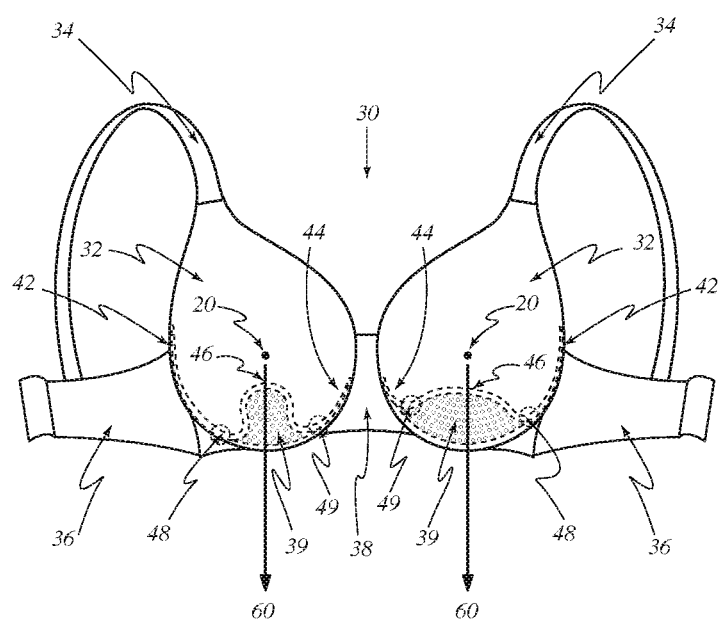
FIG. 8 is a front view of a garment according to one embodiment of the invention, in which each cup is provided with a different support form configuration.

FIG. 8 illustrates a support garment 30 in which the support form for the left cup 32 has a different configuration than the support form for the right cup 32. The two cups are connected via a medial horizontal strap 38.

Figure 9:
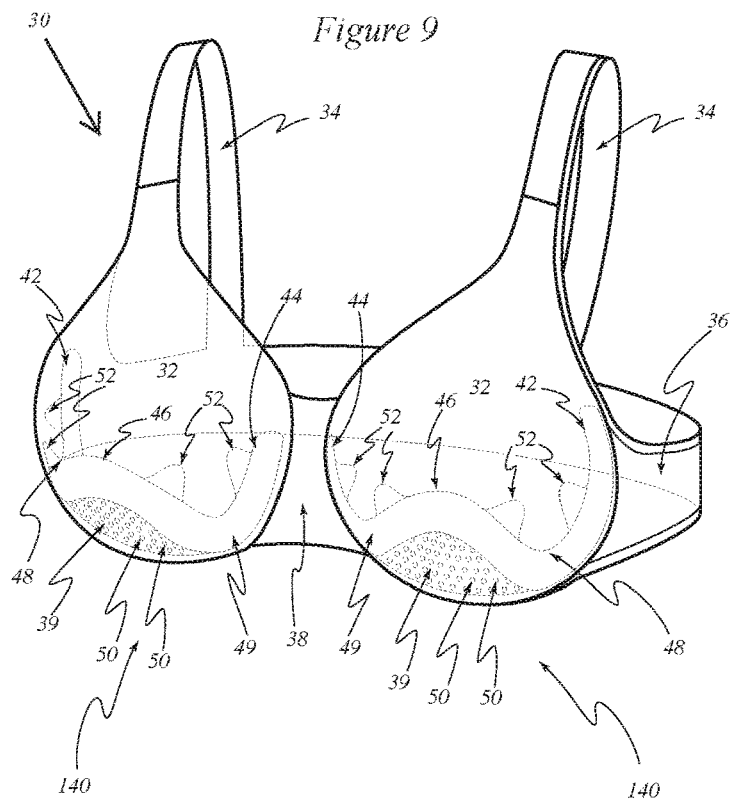
FIG. 9 is a perspective view of a garment according to an embodiment of the invention.
Figure 10:
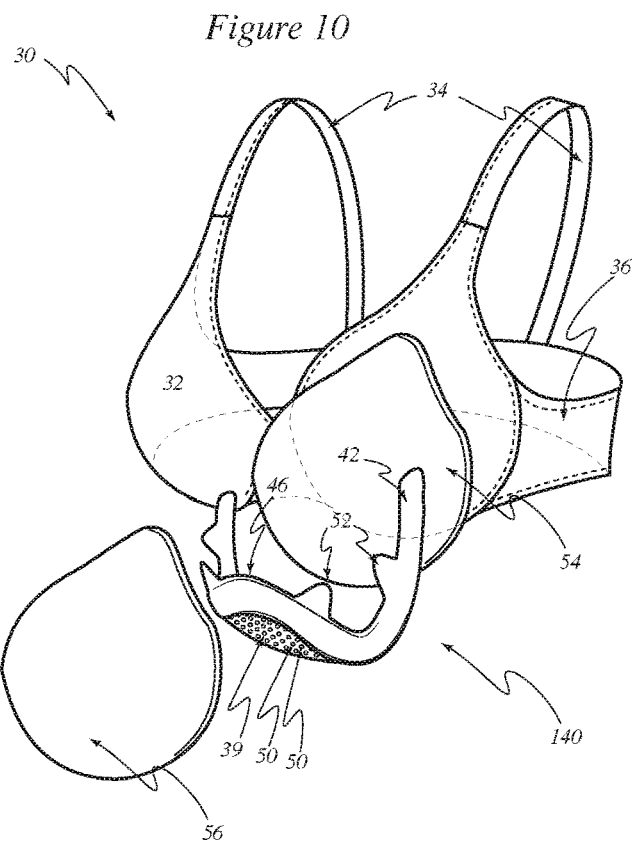
FIG. 10 is an exploded view of the garment shown in FIG. 9.
Figure 12:
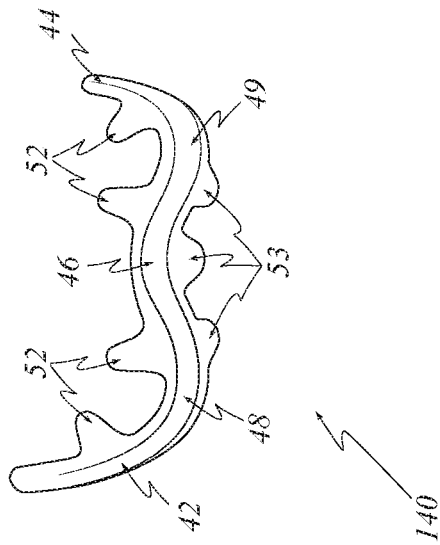
FIG. 12 is a front elevation of the support form of FIG. 11.
Figure 11:
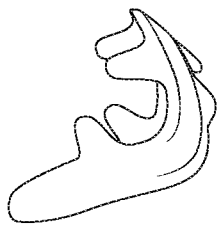
FIG. 11 is a right elevation of a support form according to an embodiment of the invention.
Figure 14:
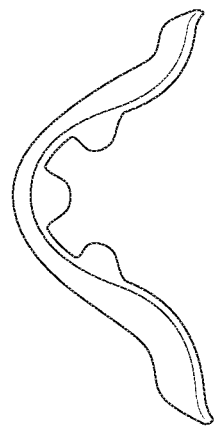
FIG. 14 is a bottom elevation of the support form of FIG. 11.
Figure 13:
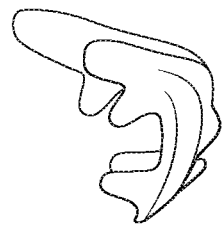
FIG. 13 is a left elevation of the support form of FIG. 11.
Figure 16:
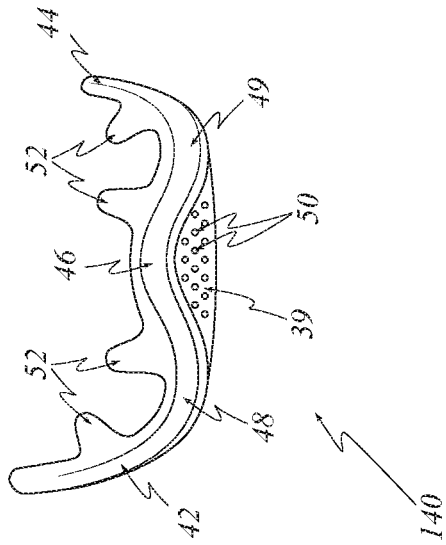
FIG. 16 is a front elevation of the support form of FIG. 15.
Figure 18:
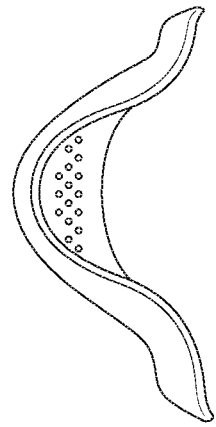
FIG. 18 is a bottom elevation of the support form of FIG. 15.
Figure 15:
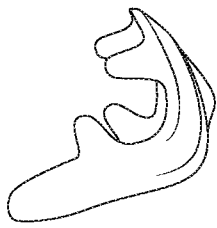
FIG. 15 is a right elevation of a support form according to another embodiment of the invention.
Figure 17:
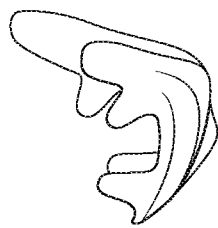
FIG. 17 is a left elevation of the support form of FIG. 15.

FIGS. 9 and 10 show an embodiment of the invention in which the support form 140 is provided with tapered phalanx-like projections, or fingers 52 along the upper edge of the form in addition to the hammock-like plane of support 39 having fenestrations 50. FIG. 10 further illustrates the support form 140 embedded between a formed inner cup 54 and a formed outer cup 56.

FIGS. 11-14 show right, front, left, and bottom views, respectively, of an inventive support form 140 having upper finger-like projections 52 along the upper edge of the support form 140 as well as lower finger-like projections 52 along the lower edge of the support form 140. FIGS. 15-18 show right, front, left, and bottom views, respectively, of another embodiment of the inventive support form 140 having upper finger-like projections 52 as well as an integrally-formed hammock-like plane of support 39.

Figure 20:
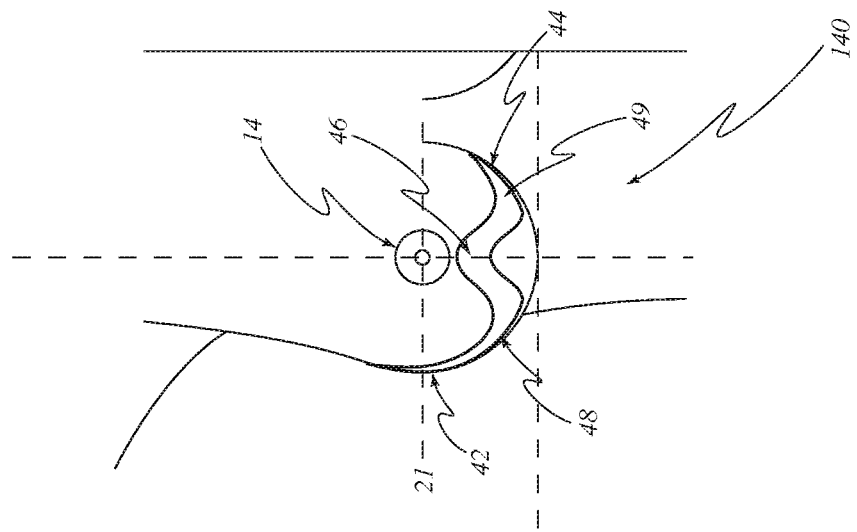
FIG. 20 is a front elevation of support form of FIG. 19.
Figure 19:
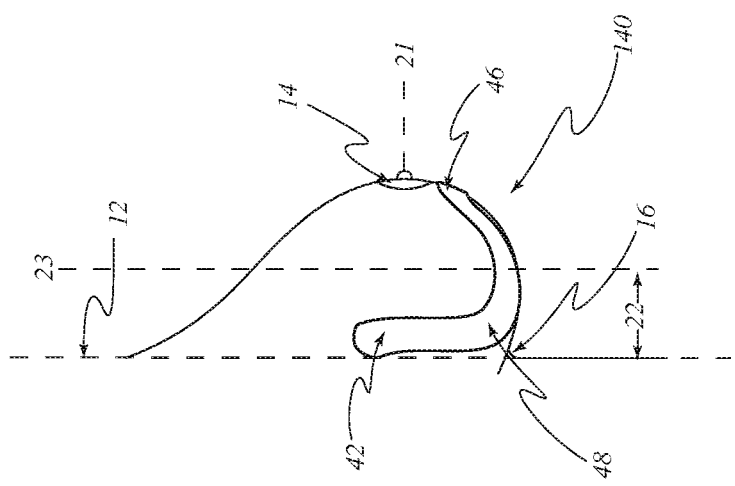
FIG. 19 is a right elevation of a configuration of the inventive support form illustrating the position of the support form on the wearer.
Figure 22:
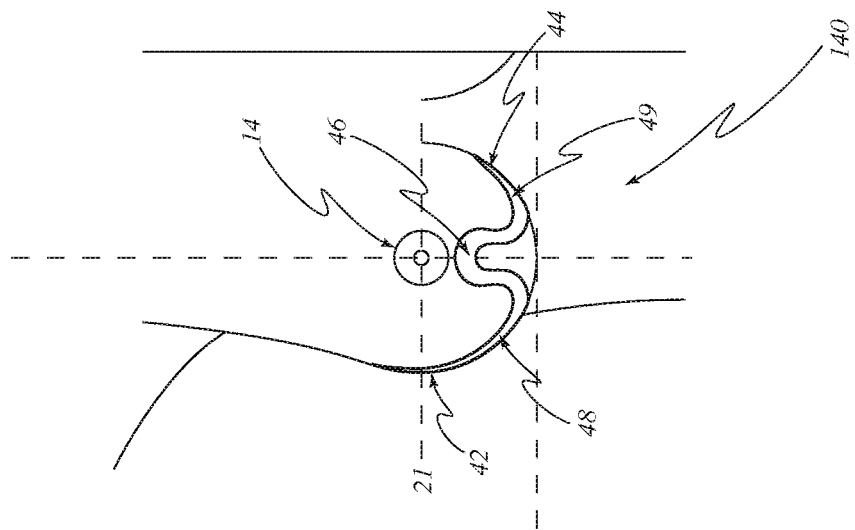
FIG. 22 is a front elevation of support form of FIG. 21.
Figure 21:
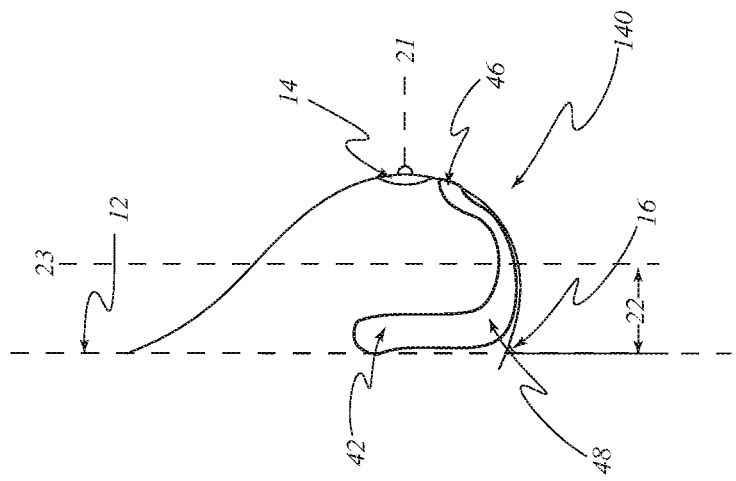
FIG. 21 is a right elevation of another configuration of the inventive support form illustrating the position of the support form on the wearer.
Figure 24:
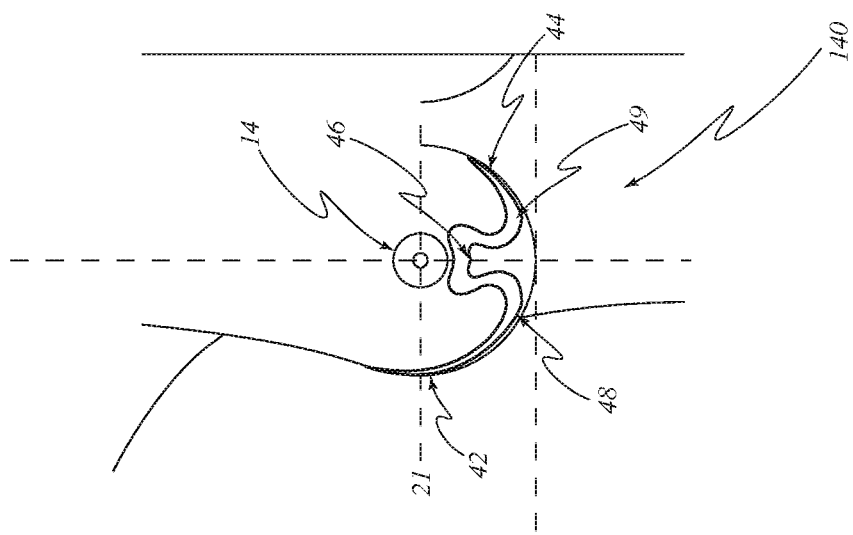
FIG. 24 is a front elevation of support form of FIG. 23.
Figure 23:
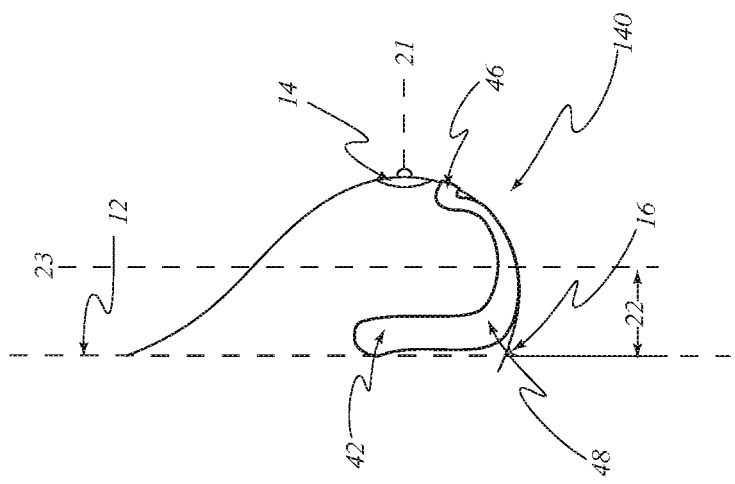
FIG. 23 is a right elevation of yet another configuration of the inventive support form illustrating the position of the support form on the wearer.
Figure 26:
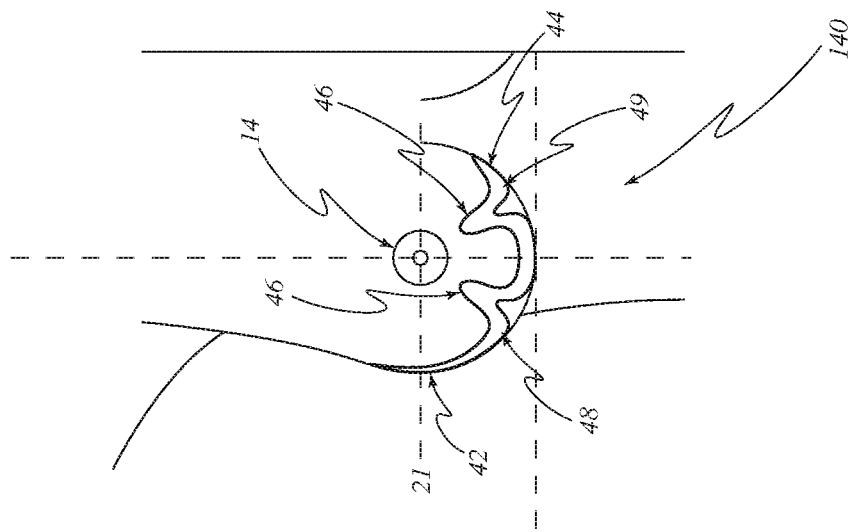
FIG. 26 is a front elevation of support form of FIG. 25.
Figure 25:
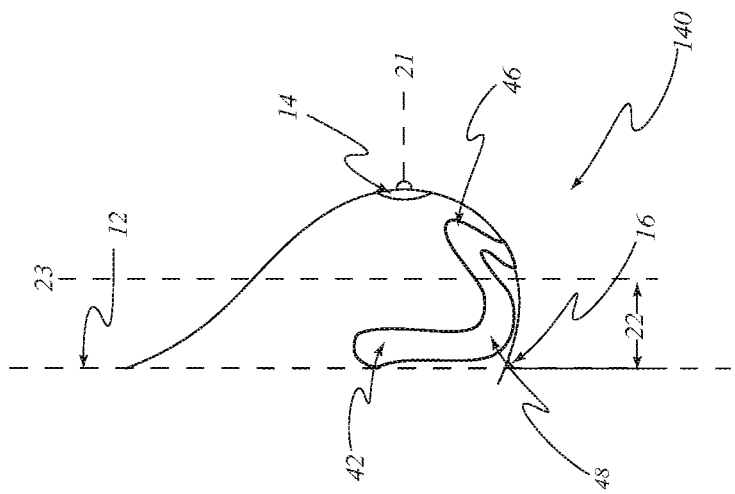
FIG. 25 is a right elevation of still another configuration of the inventive support form illustrating the position of the support form on the wearer.
Figure 28:
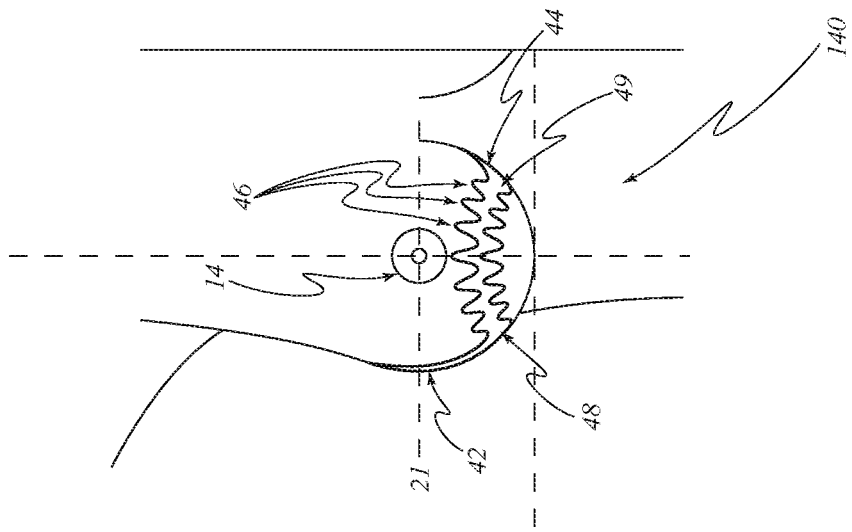
FIG. 28 is a front elevation of support form of FIG. 27.
Figure 27:
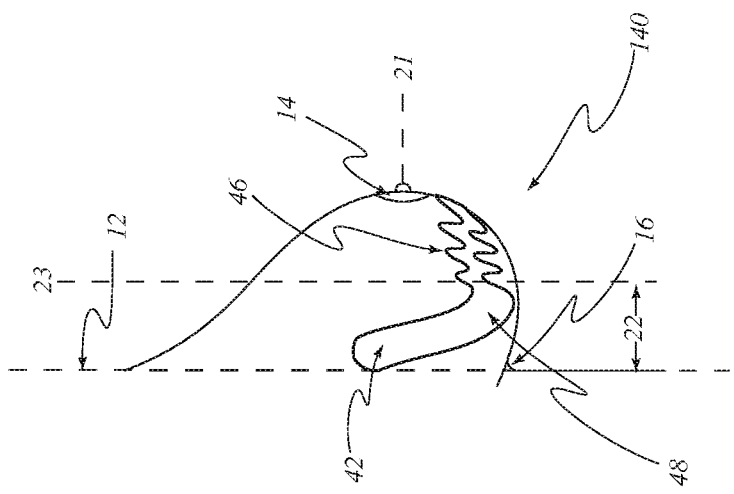
FIG. 27 is a right elevation of yet another configuration of the inventive support form illustrating the position of the support form on the wearer.

FIGS. 19-28 present a variety of configurations suitable for the inventive support form. FIGS. 19-20 illustrate a narrower wavelength of the configuration identified as the "Wave Configuration". FIGS. 21-22 present a configuration identified for convenience as the "Omega Configuration". FIGS. 23-24 present a configuration having a dimple in the undulation, identified for convenience as the "Fishtail Configuration". FIGS. 25-26 present a configuration in which the medial support structure has two independent peaks, identified for convenience as the "M Configuration". While not intended to be limiting, FIGS. 27-28 present a configuration with seven distinct peaks, identified for convenience as the "Multiwave Configuration". Each title is evocative of the respective general shape of the support form.

Additional Embodiments

Generally, the inventive support brace does not add a significant amount of mass to the inventive support garment. In addition, the inventive brace does not add greatly to the thickness of the garment cup so as to not protrude from the cup, remaining generally unnoticeable in the garment. The invention dampens the movement of the breast and does not enhance it. The fulcra are essentially rigid and transmit, rather than store, the kinetic energy of the breast's vertical movement through the lateral wings of the garment to the wearer's back where it is dissipated. The breast center of mass remains essentially in the same vertical plane. The lateral limbs terminate, and do not meet across the upper hemisphere of the cup, acting as lever arms to transmit the kinetic energy to the wearer's torso. The inventive support brace varies in thickness axially and in cross section and is characterized by a complex three-dimensional undulatory geometry which provides the required stiffness, flexibility and force transmission. The inventive support brace only extends to the inframammary fold at the medial and lateral fulcra, leaving the central intermammary region free of mechanical pressure and open to air flow and cooling.

The hammock-like portion is either present or absent. The hammock-like portion is a flexible fenestrated membrane and in some embodiments is a flexible polymeric net. The hammock portion may, for example, have a net configuration that is similar to a spiderweb, having concentric semi-circles with linear radial supports interspaced along the circumferences. Alternatively, the net configuration may have a fishnet pattern, forming triangular fenestrations, for example. The hammock-like portion is joined to the undulatory support structure. In preferred embodiments, the hammock-like portion has a concave boundary that curves away from the wearer's chest wall, with the largest distance exhibited at the midpoint of the boundary.

When present, the hammock-like portion may be manufactured of the same material as the undulatory support structure or of a different material and may be selected from, for example, polyethylene (PE), acrylonitrile-butadiene-styrene (ABS), polylactic acid (PLA), compression fabric, and a composite thereof. In instances wherein the hammock-like portion and the undulatory support structure are made of the same material, they may be simultaneously injection molded or compression molded as a single, three-dimensional structured piece.

In some embodiments, the undulatory support structure is formed simultaneously with the garment cup. The hammock portion or net, when present, may also be formed simultaneously with the garment cup. In these embodiments, the undulatory support structure and/or the net may be formed of the same material as the garment cup or may be formed of another material. For example, the garment cup may be stamped or molded from a material such that the undulatory support structure is imprinted or otherwise formed into the cup, with or without a net, such that the material provides the same or similar mechanical properties as are attributable to a separately formed support structure that otherwise is otherwise the same with respect to shape, size, and configuration.

In preferred embodiments, a reinforcing rib or ridge extends from each fulcrum along the length of each lateral appendage, and may extend partway up the lateral limbs of the medial support structure, to provide lateral stiffness with a minimal increase in material and surface area. The lateral stiffness prevents the breast from splaying in the plane parallel to the chest wall. Rather, in response to vertical force upon the medial support structure, the lateral appendages of a single undulatory support structure are urged towards each other (in the plane of the chest wall), effectively gently squeezing the breast inward side-to-side.

The fulcrums or fulcra are rigid and are not meant to stretch or bend. Energy is transferred through the fulcra to the band across the wearer's back with substantially no loss.

The tapered projections, phalanges, or scallops become gradually more flexible along the length of the member distal from the relatively thick undulatory support structure. The lower rigidity of these scallops more gently transmits the wearer's breast weight through the support structure for improved comfort.

Figure 29:
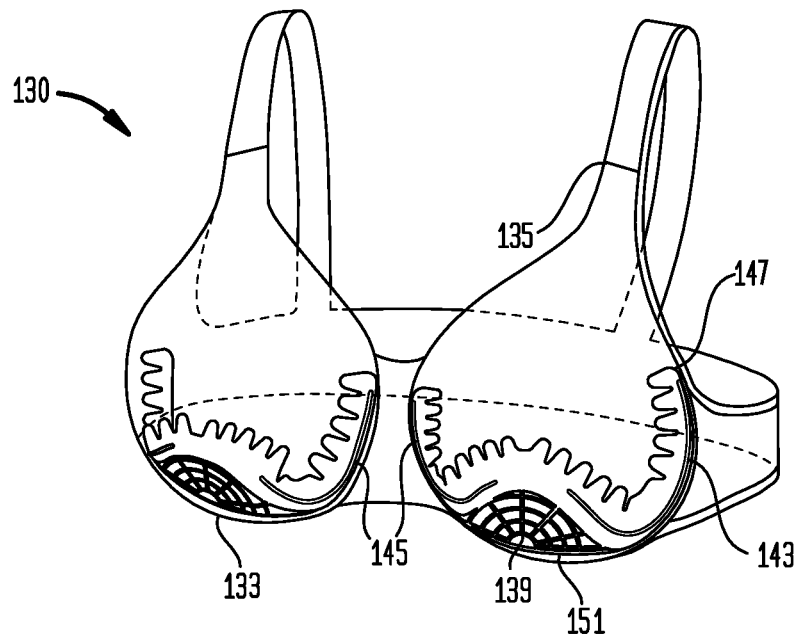
FIG. 29 is a perspective view of a preferred embodiment of the inventive support brace illustrating the position in an inventive garment.
Figure 30:
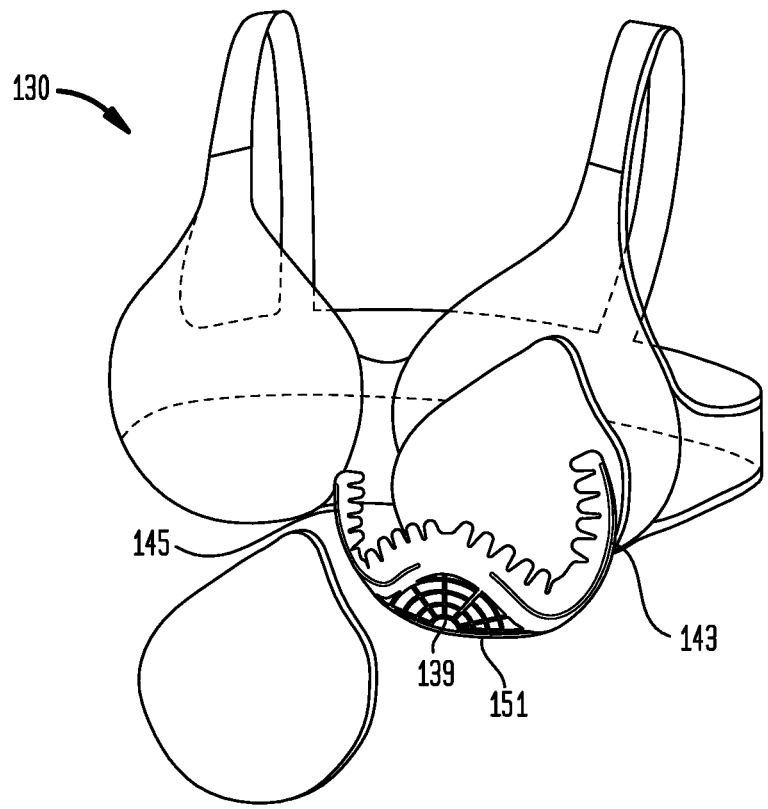
FIG. 30 is an exploded view of a preferred embodiment of the inventive garment.
Figure 31:
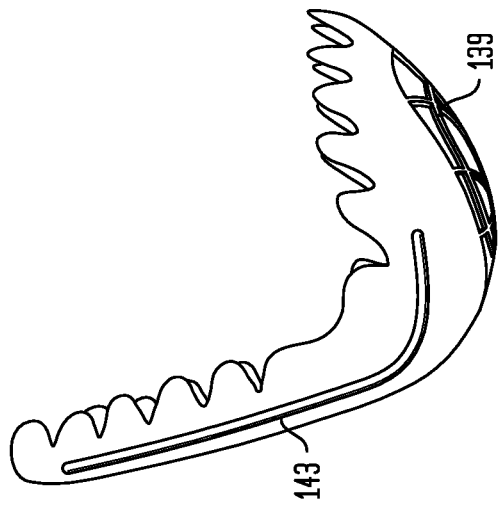
FIGS. 31-34 are a right elevation, a front elevation, a left elevation, and a bottom elevation, respectively, of the support brace of FIG. 29.
Figure 32:
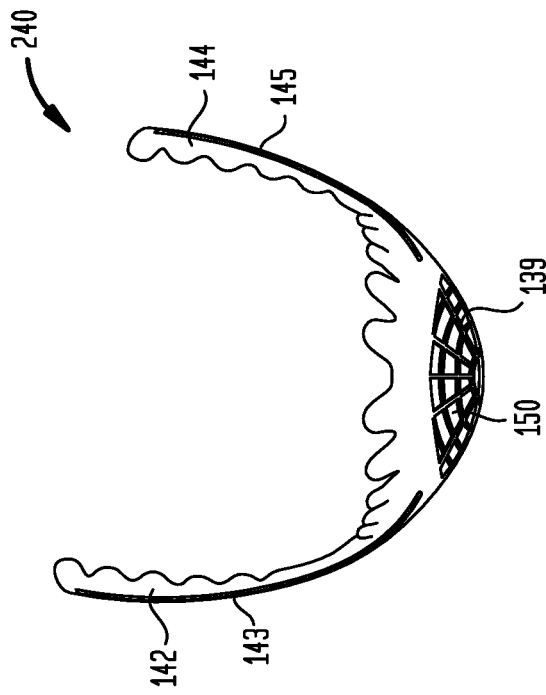
Figure 33:
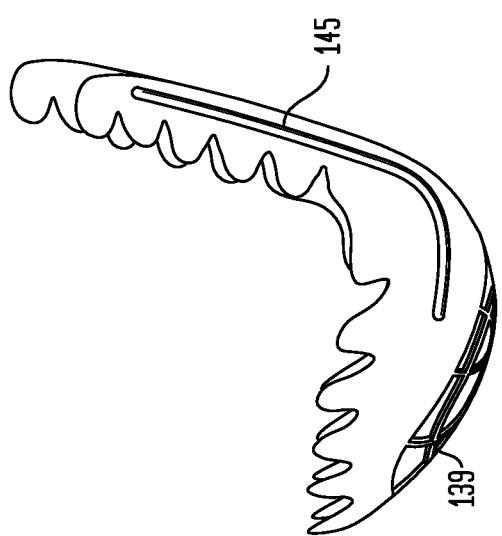
Figure 34:
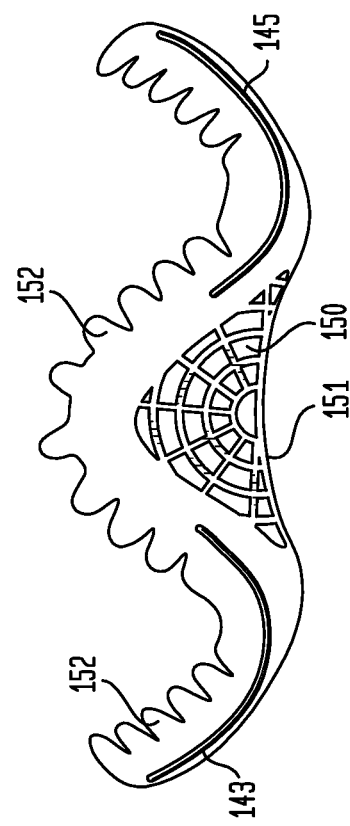

FIGS. 29-34 illustrate a preferred embodiment of the present invention. FIGS. 29-30 illustrate the position and general construction of the inventive support frame or brace in an exemplary support garment 130. The edge 151 of the hammock 139 is spaced from the caudal edge 133 of the cup. The distal end 147 of the lateral limb is spaced from the juncture 135 beginning the shoulder strap. As illustrated in FIGS. 31-34, the inventive support brace 240 comprises an undulatory support structure 240 and a hammock or net 139 formed simultaneously of the same material. The undulatory support structure 240 comprises two lateral appendages seamlessly joined to an arched medial support structure by two fulcra, as previously described. The undulatory support structure is further provided with two reinforcing ridges 143, 145 along each appendage, traversing each fulcrum, and extending into the medial support structure, but not fully across the arched surface of the medial support structure. The medial appendage 144 positioned proximate the wearer's sternum is slightly shorter than the lateral appendage 142 positioned proximate the wearer's underarm. The craniad boundary of the undulatory support structure 240 is further provided with a plurality of scallops or teeth 152 which extend the region of the wearer's breast that is cradled by the support brace 240. The net 139 defines an approximately spiderweb-like pattern defining fenestrations or gaps 150, therebetween. The net 139 is also provided with a convex curvature 151 at the boundary positioned proximate the inframammary fold.

An exemplary support brace may have fenestrations with shapes approximating circular, triangular, or quadrilateral, with the length and width of the fenestrations ranging from about 1 to 5 mm by about 3 to 12 mm. Each ridge may be raised enough such that the thickness of the cross-section of the combined fulcrum and ridge is 1.5 or more times the thickness of the fulcrum alone. The convex boundary of the net may be approximately 10 to 12 mm from the inframammary fold of the wearer, with a radius of curvature of approximately 70 to 100 mm. Each scallop, or tapered projection, may have a base of about 10 mm or more and may extend to a height of 8 to 12 mm, such that the base of the scallop may be about 30% thicker than the tip. The medial support structure may have a peak extending craniad to a height of about 60-70 mm from the adjacent fulcra, or about ¼ of the full length of the undulatory support structure. The full length of the undulatory support structure may be approximately 2½ times the distance between the fulcra. The lateral appendage proximate the wearer's underarm may be approximately 1 cm longer than the medial appendage proximate the wearer's sternum.

Summary of Embodiments

There is thus provided in Embodiment No. 1 a support garment comprising: a support band extending laterally around the wearer's torso and two cups, each having a form-fitting enclosure, each cup further comprising: a cantilevered sinusoidal support form having: a) A laterally terminating first lateral appendage having a proximal and a distal end; b) A laterally terminating second lateral appendage having a proximal end and a distal end; c) A first fulcrum; d) A second fulcrum; and e) A sinusoidal medial rib; wherein the first fulcrum joins the proximal end of the first lateral appendage and a first end of the sinusoidal medial rib and the second fulcrum joins the proximal end of the second lateral appendage and a second end of the sinusoidal medial rib, and wherein one of the lateral appendages of each cantilevered sinusoidal support form is secured to the cup or to the support band adjacent to each cup such that the support garment is effective to transfer the weight of a breast to the torso of a wearer.

Embodiment No. 2 is the support garment of Embodiment No. 1, wherein the sinusoidal medial rib is provided with at least one peak up to about 100 peaks.

Embodiment No. 3 is the support garment of Embodiment No. 2, wherein the at least one peak extends vertically to a position ranging from the vertical axis of a theoretical center of mass of a breast up to the apex of the breast.

Embodiment No. 4 is the support garment of any of Embodiment Nos. 1 to 3, wherein the sinusoidal medial rib simulates the arc of a convex undersurface of an idealized breast.

Embodiment No. 5 is the support garment of any of Embodiment Nos. 1 to 4, wherein the sinusoidal medial rib comprises at least two peaks between the first fulcrum and the second fulcrum.

Embodiment No. 6 is the support garment of any of Embodiment Nos. 1 to 5, wherein the support form is characterized by greater rigidity than the cup, such that the support form is sufficiently rigid to support the weight of the breast.

Embodiment No. 7 is the support garment of any of Embodiment Nos. 1 to 6, wherein the support form is porous or fenestrated, having a pore size or fenestration size effective to allow passage of water vapor and oxygen.

Embodiment No. 8 is the support garment of any of Embodiment Nos. 1 to 7, wherein the support form is encased in a porous or perforated material.

Embodiment No. 9 is the support garment of any of Embodiment Nos. 1 to 8, wherein at least one edge of the support form has a smooth configuration.

Embodiment No. 10 is the support garment of any of Embodiment Nos. 1 to 9, wherein the support form further comprises tapered projections along at least one edge of at least one element of the support form.

Embodiment No. 11 is the support garment of any of Embodiment Nos. 1 to 10, wherein the support form further comprises a suspension element bordered by the first fulcrum, the sinusoidal medial rib, the second fulcrum, and the wearer's chest wall.

Embodiment No. 12 is the support garment of Embodiment No. 11, wherein the suspension element is formed of a material selected from the group consisting of: a natural textile, a synthetic textile, a membranous material; a mesh material; a foamed polymer; a porous polymeric material; and a fenestrated polymeric material.

Embodiment No. 13 is the support garment of Embodiment No. 11, wherein the suspension element is contiguous and formed of the same material as a remainder of the support form or the suspension element is contiguous and formed of the same material as a remainder of the support form.

Embodiment No. 14 is the support garment of any of Embodiment Nos. 1 to 10, wherein the elements of the support form do not enter the inframammary fold.

Embodiment No. 15 is the support garment of any of Embodiment Nos. 1 to 14, wherein each support form is embedded between an outer cup form and an inner cup form.

Embodiment No. 16 is the support garment of Embodiment No. 15, wherein the outer cup form and the inner cup form are manufactured from a material selected from the group consisting of: foam; molded polymer; molded fibrous material; and a contour cup.

Embodiment No. 17 is the support garment of any of Embodiment Nos. 1 to 16, wherein the two cups each have a support form characterized by a different configuration.

Embodiment No. 18 is the support garment of any of Embodiment Nos. 1 to 16, wherein the two cups each have a support form matching with respect to the shape and size.

Embodiment No. 19 is the support garment of any of Embodiment Nos. 1 to 18, wherein the support form is characterized by anti-microbial and/or pH control properties.

Embodiment No. 20 is the support garment of any of Embodiment Nos. 1 to 19, wherein the support form is integrally formed into the support garment.

Embodiment No. 21 is the support garment of any of Embodiment Nos. 1 to 20, wherein the dimensions of the support form are predetermined to conform to a desired cup size.

Embodiment No. 22 is the support garment of any of Embodiment Nos. 1 to 21, wherein the distance between the first lateral appendage and the second lateral appendage is from about 9 cm to about 23 cm.

Embodiment No. 23 is the support garment of any of Embodiment Nos. 1 to 22, wherein the sinusoidal medial rib comprises at least one peak that extends from about 1.8 cm to about 12 cm from the first fulcrum and the second fulcrum.

Embodiment No. 24 is the support garment of any of Embodiment Nos. 1 to 23, wherein the support garment is selected from the group consisting of: a brassiere, a swimsuit, a sport top, a military foundation garment, and a post-surgical garment.

Embodiment No. 25 is the support garment of any of Embodiment Nos. 1 to 24, wherein the support form is formed of a material selected from the group consisting of: a metal, a natural polymeric material, a synthetic organic polymeric material, a silicon-based material, a gel, a resilient plant-derived material, and a resilient animal-derived material.

Embodiment No. 26 is the support garment of Embodiment No. 25, wherein the support form further comprises a material selected from the group consisting of: a natural textile material, a synthetic textile material, a foamed polymeric material, and a perforated polymeric material.

Embodiment No. 27 is the support garment of any of Embodiment Nos. 1 to 26, wherein at least one cup is provided with a breast simulacrum suitable for providing symmetry for a wearer lacking at least one breast.

Embodiment No. 28 is the support garment of any of Embodiment Nos. 1 to 27, wherein the support garment lacks shoulder straps.

Embodiment No. 29 is the support garment of any of Embodiment Nos. 1 to 28, wherein no connecting element is provided between the first cup and the second cup across the wearer's chest.

Embodiment No. 30 is the support garment of any of Embodiment Nos. 1 to 29, wherein the first lateral appendage, the second lateral appendage, and the sinusoidal medial rib each have a cross-section selected from the group consisting of: rectangular, circular, oval, and complex polygonal.

Embodiment No. 31 is the support garment of any of Embodiment Nos. 1 to 30, wherein the first lateral appendage, the second lateral appendage, and the sinusoidal medial rib are solid or hollow.

Embodiment No. 32 is the support garment of Embodiment No. 31, wherein the first lateral appendage, the second lateral appendage, and the sinusoidal medial rib are hollow and are provided with a gas or a fluid therein.

Embodiment No. 33 is a support garment comprising: a support band extending laterally around the wearer's torso and two cups, each having a form-fitting enclosure, each cup further comprising: a cantilevered support form secured to the support band having: a) A laterally terminating first lateral appendage having an caudad end and a craniad end; b) A laterally terminating second lateral appendage having an caudad end and a craniad end; c) A first fulcrum; d) A second fulcrum; and e) A medial support structure; wherein the first fulcrum joins the caudad end of the first lateral appendage and a first end of the medial support structure and the second fulcrum joins the caudad end of the second lateral appendage and a second end of the medial support structure, and whereby when a breast is disposed upon the medial support structure, rotational force around each fulcrum urges the craniad end of each lateral appendage posteroanteriorly, thus transferring the weight of the breast to the support band by way of tension across the back of the wearer.

Embodiment No. 34 is the support garment of Embodiment No. 33, wherein the medial support structure is provided with at least one peak up to about 100 peaks.

Embodiment No. 35 is the support garment of Embodiment No. 34, wherein the at least one peak extends vertically to a position ranging from the vertical axis of a theoretical center of mass of a breast up to the apex of the breast.

Embodiment No. 36 is the support garment of any of Embodiment Nos. 33 to 35, wherein the medial support structure simulates the arc of a convex undersurface of an idealized breast.

Embodiment No. 37 is the support garment of any of Embodiment Nos. 33 to 36, wherein the medial support structure comprises at least two peaks between the first fulcrum and the second fulcrum.

Embodiment No. 38 is the support garment of any of Embodiment Nos. 33 to 37, wherein the cantilevered support form is characterized by greater rigidity than the cup, such that the cantilevered support form is sufficiently rigid to support the weight of the breast.

Embodiment No. 39 is the support garment of any of Embodiment Nos. 33 to 38, wherein the cantilevered support form is porous or fenestrated, having a pore size or fenestration size effective to allow passage of water vapor and oxygen.

Embodiment No. 40 is the support garment of any of Embodiment Nos. 33 to 39, wherein the cantilevered support form is encased in a porous or perforated material.

Embodiment No. 41 is the support garment of any of Embodiment Nos. 33 to 40, wherein at least one edge of the support form has a smooth configuration.

Embodiment No. 42 is the support garment of any of Embodiment Nos. 33 to 41, wherein the cantilevered support form further comprises tapered projections along at least one edge of at least one element of the cantilevered support form.

Embodiment No. 43 is the support garment of any of Embodiment Nos. 33 to 42, wherein the cantilevered support form further comprises a suspension element bordered by the first fulcrum, the medial support structure, the second fulcrum, and the wearer's chest wall.

Embodiment No. 44 is the support garment of Embodiment No. 43, wherein the suspension element is formed of a material selected from the group consisting of: a natural textile, a synthetic textile, a membranous material; a mesh material; a foamed polymer; a porous polymeric material; and a fenestrated polymeric material.

Embodiment No. 45 is the support garment of Embodiment No. 43, wherein the suspension element is contiguous and formed of the same material as a remainder of the cantilevered support form or the suspension element is contiguous and formed of the same material as a remainder of the cantilevered support form.

Embodiment No. 46 is the support garment of any of Embodiment Nos. 33 to 45, wherein the medial support structure is laterally deformable, whereby when vertical force on the breast is increased, the medial support structure is urged to transiently distend, inducing tension in the suspension element, thereby transferring the increased vertical force laterally through the cantilevered support form.

Embodiment No. 47 is the support garment of any of Embodiment Nos. 33 to 42, wherein the elements of the cantilevered support form do not enter the inframammary fold.

Embodiment No. 48 is the support garment of any of Embodiment Nos. 33 to 47, wherein each cantilevered support form is embedded between an outer cup form and an inner cup form.

Embodiment No. 49 is the support garment of Embodiment No. 48, wherein the outer cup form and the inner cup form are manufactured from a material selected from the group consisting of: foam; molded polymer; molded fibrous material; and a contour cup.

Embodiment No. 50 is the support garment of any of Embodiment Nos. 33 to 49, wherein the two cups each have a cantilevered support form characterized by a different configuration.

Embodiment No. 51 is the support garment of any of Embodiment Nos. 33 to 50, wherein the two cups each have a cantilevered support form matching with respect to the shape and size.

Embodiment No. 52 is the support garment of any of Embodiment Nos. 33 to 51, wherein the cantilevered support form is characterized by anti-microbial and/or pH control properties.

Embodiment No. 53 is the support garment of any of Embodiment Nos. 33 to 52, wherein the cantilevered support form is integrally formed into the support garment.

Embodiment No. 54 is the support garment of any of Embodiment Nos. 33 to 53, wherein the dimensions of the cantilevered support form are predetermined to conform to a desired cup size.

Embodiment No. 55 is the support garment of any of Embodiment Nos. 33 to 54, wherein the distance between the first lateral appendage and the second lateral appendage is from about 9 cm to about 23 cm.

Embodiment No. 56 is the support garment of any of Embodiment Nos. 33 to 55, wherein the medial support structure comprises at least one peak that extends from about 1.8 cm to about 12 cm from the first fulcrum and the second fulcrum.

Embodiment No. 57 is the support garment of any of Embodiment Nos. 33 to 56, wherein the support garment is selected from the group consisting of: a brassiere, a swimsuit, a sport top, a military foundation garment, and a post-surgical garment.

Embodiment No. 58 is the support garment of any of Embodiment Nos. 33 to 57, wherein the cantilevered support form is formed of a material selected from the group consisting of: a metal, a natural polymeric material, a synthetic organic polymeric material, a silicon-based material, a gel, a resilient plant-derived material, and a resilient animal-derived material.

Embodiment No. 59 is the support garment of Embodiment No. 58, wherein the cantilevered support form further comprises a material selected from the group consisting of: a natural textile material, a synthetic textile material, a foamed polymeric material, and a perforated polymeric material.

Embodiment No. 60 is the support garment of any of Embodiment Nos. 33 to 59, wherein at least one cup is provided with a breast simulacrum suitable for providing symmetry for a wearer lacking at least one breast.

Embodiment No. 61 is the support garment of any of Embodiment Nos. 33 to 60, wherein the support garment lacks shoulder straps.

Embodiment No. 62 is the support garment of any of Embodiment Nos. 33 to 61, wherein no connecting element is provided between the first cup and the second cup across the wearer's chest.

Embodiment No. 63 is the support garment of any of Embodiment Nos. 33 to 62, wherein the first lateral appendage, the second lateral appendage, and the medial support structure each have a cross-section selected from the group consisting of: rectangular, circular, oval, and complex polygonal.

Embodiment No. 64 is the support garment of any of Embodiment Nos. 33 to 63, wherein the first lateral appendage, the second lateral appendage, and the medial support structure are solid or hollow.

Embodiment No. 65 is the support garment of Embodiment No. 64, wherein the first lateral appendage, the second lateral appendage, and the medial support structure are hollow and are provided with a gas or a fluid therein.

Embodiment No. 66 is a support garment comprising: a support band extending laterally around the wearer's torso and two cups, each having a form-fitting enclosure, each cup further comprising: a cantilevered support form secured to the cup or to the support band having: a) second laterally terminating appendage; b) A first and a second fulcrum joined to the first and the second laterally terminating appendage; and c) a medial rib extending between the first fulcrum and second fulcrum, continuously extending across the lower portion of a user's breast from one side to the otherA first and a, said medial rib having at least one peak such that the medial rib defines either an open area or a hammock-like area across the lower portion of the user's breast; wherein when a breast is disposed upon the medial support structure, rotational force around each fulcrum urges a craniad end of each lateral appendage posteroanteriorly, thus transferring the weight of the breast to the back of the wearer by way of tension across the support band.

Embodiment No. 67 is the support garment of Embodiment No. 66, wherein the support form is effective to dampen breast movement.

While the invention has been described in detail, modifications within the spirit and scope of the invention will be readily apparent to those of skill in the art and is not limited to the details of construction and the arrangement of components set forth herein. In view of the foregoing discussion, relevant knowledge in the art and references discussed above in connection with the Background and Detailed Description, the disclosures of which are all incorporated herein by reference, further description is deemed unnecessary. In addition, it should be understood that aspects of the invention and portions of various embodiments may be combined or interchanged either in whole or in part. Furthermore, those of ordinary skill in the art will appreciate that the foregoing description is by way of example only, and is not intended to limit the invention.

What is claimed is:

1. A support garment comprising:
   a support band extending around a wearer's torso and
   two cups secured to the support band, each cup having a cavity for receiving a breast of a wearer and provided with a one-piece molded undulatory support structure including:
   (a) a medial support comprising a sinuosity having two branches; and
   (b) a pair of lateral support appendages joined to the branches of the medial support through a pair of fulcrums;
   wherein the undulatory support structures are disposed in the cups, spaced from a caudal edge of the respective cup, are shaped to follow a curvature of a base of an idealized breast and are adapted to expand in response to applied force and recoil when applied force is removed, and wherein the garment and support structures are configured and adapted to have the following further attributes:
   (i) when worn, the medial supports are positioned about the base of the wearer's breasts, such that the medial supports are below nipple areolar complexes of the breasts, the fulcrums are proximate inframammary folds of the wearer and the support appendages extend craniad, the support appendages are secured to the cups or to the support band such that a weight of the breasts is supported about the base of the breast by the medial supports and the breasts of the wearer are supported away from inframammary folds of the wearer and wherein vertical forces due to the weight of the breasts on the support structures are redirected to a back of the wearer and away from shoulders of the wearer though the fulcrums, the lateral support appendages and the support band.

2. The support garment of claim 1, wherein each undulatory support structure further comprises a reinforcing rib extending from the fulcrums along each lateral appendage, such that a cross-section thereof varies along a length of the undulatory support structure.

3. The support garment of claim 1, wherein each undulatory support structure is characterized by greater rigidity than each cup, such that the undulatory support structure is sufficiently rigid to support the weight of the breast.

4. The support garment of claim 1, wherein each undulatory support structure further comprises tapered scalloped projections along at least one edge of at least one element selected from the medial support, the pair of lateral support appendages, and the fulcrums.

5. The support garment of claim 1, wherein each undulatory support structure is embedded between an outer cup and an inner cup.

6. The support garment of claim 1, wherein the undulatory support structures of the cups are each characterized by a different configuration.

7. The support garment of claim 1, wherein the undulatory support structures of the cups match with respect to shape and size.

8. The support garment of claim 1, wherein each undulatory support structure is a three-dimensionally curved article having a top edge substantially parallel with a bottom edge thereof.

9. The support garment of claim 1, wherein each medial support is provided with at least one peak up to about 100 peaks.

10. The support garment of claim 9, wherein the at least one peak extends vertically to a position ranging from a vertical axis of a theoretical center of mass of the respective breast up to an apex of the breast.

11. The support garment of claim 1, wherein each lateral support appendage of each undulatory support structure terminates at an end adjacent to a craniad edge of the support band or adjacent to a craniad edge of a medial strap joining the two cups; and wherein the end of each lateral support appendage is spaced from shoulder straps.

12. The support garment of claim 1, wherein the support garment lacks shoulder straps.

13. The support garment of claim 1, wherein the support garment is selected from the group consisting of: a brassiere, a swimsuit, a sport top, a military foundation garment, and a post-surgical garment.

14. A support garment comprising:
   a support band extending around a wearer's torso and
   two cups secured to the support band, each cup having a cavity for receiving a breast of a wearer and provided with a one-piece, molded undulatory support structure including:
   (a) a medial support comprising a plurality of support segments joined to one another and extending in two or more directions and a support hammock attached across two or more support segments of the medial support; and (b) a pair of lateral support appendages joined to the support segments of the medial support through a pair of fulcrums;

wherein the undulatory support structures are disposed in the cups spaced from a caudal edge of the respective cup and are shaped to follow a curvature of a base of an idealized breast and are adapted to expand in response to applied force and recoil when applied force is removed, and wherein the garment and support structures are configured and adapted to have the following further attributes:

(i) when worn, the medial supports are positioned about the base of wearer's breasts, such that the medial supports are below nipple areolar complexes of the breasts, the fulcrums are proximate inframammary folds of the wearer and the support appendages extend craniad, the support appendages are secured to the cups or to the support band such that a weight of the breasts is supported about the base of the breast by the medial supports and the breasts of the wearer are supported away from inframammary folds of the wearer and wherein vertical forces due to the weight of the breasts on the support structures are redirected to a back of the wearer and away from shoulders of the wearer though the fulcrums, the lateral support appendages and the support band; and (ii) said support hammocks extend between two or more support segments of the medial supports in order to further support the base of the breasts of the wearer away from the inframammary folds of the wearer; wherein each support hammock has a concave boundary adjacent the inframammary fold, said concave boundary extending from the pair of fulcrums across the base of the wearer's breast.

15. The support garment of claim 14, wherein the medial support, lateral support appendages, and fulcrums of each undulatory support structure are formed of a material selected from the group consisting of polyethylene, acrylonitrile-butadiene-styrene, polylactic acid, and a combination thereof.

16. The support garment of claim 14, wherein each support hammock is formed from a material selected from polyethylene, acrylonitrile-butadiene-styrene, polylactic acid, compression fabric, gauze, and a combination thereof.

17. The support garment of claim 14, wherein each undulatory support structure and support hammock are a three-dimensionally curved article, with the undulatory support structure having a top edge substantially parallel with a bottom edge thereof.

18. The support garment of claim 14, wherein each support hammock has a net configuration.

19. The support garment of claim 14, wherein each support hammock is a flexible, fenestrated membrane.

20. The support garment of claim 1, wherein the medial support, lateral support appendages, and fulcrums of each undulatory support structure are formed of a material selected from the group consisting of polyethylene, acrylonitrile-butadiene-styrene, polylactic acid, and a combination thereof.

21. A support garment, comprising:

a support band operative to extend around a wearer's torso;

two cups secured to the support band, each cup having a cavity for receiving a breast of the wearer;

a shoulder strap affixed to each cup; and a pliable, resilient, one-piece, molded brace disposed in each cup, spaced from a caudal edge of the cup and from the respective shoulder strap, having a continuous curving structure comprising a first lateral support appendage seamlessly joined by a first fulcrum to a medial support, said medial support extending from the first fulcrum across a base of the cup to a second fulcrum, said medial support seamlessly joined by the second fulcrum to a second lateral support appendage; the first and second lateral support appendages each terminating at an end;

wherein when the support garment is worn, the medial support in each cup is positioned about a base of the wearer's breast, the first and second fulcrums are proximate inframammary folds of the wearer, and the first and second lateral support appendages extend craniad, such that the breasts of the wearer are supported away from the inframammary folds and vertical forces due to breast weight on the medial supports are redirected from the wearer's shoulders to the wearer's back though the first and second fulcrums, the first and second lateral support appendages, and the support band.

* * * * *